United States Patent
Siomina et al.

(10) Patent No.: US 11,265,960 B2
(45) Date of Patent: Mar. 1, 2022

(54) METHODS OF RELIABLE PAGING TRANSMISSION UNDER UE EDRX

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 822 days.

(21) Appl. No.: 16/071,314

(22) PCT Filed: Jan. 31, 2017

(86) PCT No.: PCT/SE2017/050079
§ 371 (c)(1),
(2) Date: Jul. 19, 2018

(87) PCT Pub. No.: WO2017/135871
PCT Pub. Date: Aug. 10, 2017

(65) Prior Publication Data
US 2021/0212153 A1    Jul. 8, 2021

Related U.S. Application Data
(60) Provisional application No. 62/289,725, filed on Feb. 1, 2016.

(51) Int. Cl.
*H04W 76/28*    (2018.01)
*H04W 68/00*    (2009.01)
*H04W 4/70*    (2018.01)

(52) U.S. Cl.
CPC ......... *H04W 76/28* (2018.02); *H04W 68/005* (2013.01); *H04W 4/70* (2018.02)

(58) Field of Classification Search
CPC ... H04W 76/28; H04W 68/02; H04W 68/005; H04W 68/00; H04W 24/10
See application file for complete search history.

(56) References Cited

U.S. PATENT DOCUMENTS

2009/0017844 A1* 1/2009 Li .................. H04W 68/00
                                                    455/458
2016/0044605 A1* 2/2016 Vajapeyam ...... H04W 52/322
                                                    370/311

(Continued)

FOREIGN PATENT DOCUMENTS

EP    3 412 086 B1    1/2017
RU    2010 117 232 A    10/2008

(Continued)

OTHER PUBLICATIONS

Japanese Office Action issued for Application No. 2018-536431— dated Jun. 7, 2019.

(Continued)

*Primary Examiner* — Dung Hong
(74) *Attorney, Agent, or Firm* — Baker Botts, LLP

(57) ABSTRACT

A method in a network node (115) comprises obtaining (704) a length of a paging transmission window (PTW) (515) within a discontinuous reception (DRX) cycle of a first type (505) configured in a first cell, and obtaining (708) at least one of a number of DRX cycles of a second type (525) remaining within the PTW with respect to a reference time in the first cell and an amount of time remaining within the PTW starting from the reference time. The method comprises determining (712) whether a paging message can be transmitted in the first cell based on the obtained at least one of the number of DRX cycles of the second type remaining within the PTW with respect to the reference time in the first (Continued)

cell and the amount of time remaining within the PTW starting from the reference time.

19 Claims, 13 Drawing Sheets

(56) References Cited

U.S. PATENT DOCUMENTS

| | | | | |
|---|---|---|---|---|
| 2016/0112986 | A1* | 4/2016 | Patil | H04W 68/02 455/515 |
| 2016/0345293 | A1* | 11/2016 | Diachina | H04W 68/02 |
| 2017/0201963 | A1* | 7/2017 | Zhang | H04W 76/28 |
| 2017/0273136 | A1* | 9/2017 | Siomina | H04W 76/28 |
| 2017/0374645 | A1* | 12/2017 | Tirronen | H04W 68/005 |
| 2018/0279256 | A1* | 9/2018 | Wu | H04W 68/005 |
| 2018/0338281 | A1* | 11/2018 | Bangolae | H04W 52/0216 |
| 2019/0028999 | A1* | 1/2019 | Yerramalli | H04W 52/0225 |

FOREIGN PATENT DOCUMENTS

| | | |
|---|---|---|
| RU | 2 427 981 C2 | 8/2011 |
| RU | 2 518 221 C2 | 6/2014 |
| WO | 03 058992 A1 | 7/2003 |
| WO | 2013 169789 A1 | 11/2013 |

OTHER PUBLICATIONS

3GPP TSG-RAN WG3 Meeting #90; Anaheim, USA; Source: Alcatel-Lucent, Alcatel-Lucent Shanghai Bell; Title: Impact of LTE eDRX on S1AP (R3-152713)—Nov. 16-20, 2015.

3GPP TSG-RAN WG3#90; Anaheim, USA; Source: Qualcomm Incorporated; Title: LTE eDRX Status and Way Forward in RAN3 (R3-152723)—Nov. 16-20, 2015.

Russian Decision To Grant issued for Application No. 2018-131142—dated Jan. 31, 2017.

SA WG2 Meeting #112; Anaheim, USA; Change Request; Title: Introducing Extended Idle mode DRX; Source to WG: Ericsson, Qualcomm Incorporated; Source to TSG: SA2 (S2-154070)—Nov. 16-20, 2015.

Office Action issued by ARPTO for Patent Application N° P170100248—dated May 19, 2021.

PCT International Preliminary Report On Patentability for International application No. PCT/SE2017/050079—dated Apr. 20, 2018.

3GPP TSG-RAN WG2 Meeting #91; Beijing, China; Source: Fujitsu; Title: SFN extension vs Timer based solution for extended Idle DRX cycle (R2-153108)—Aug. 24-28, 2015.

PCT International Search Report for International application No. PCT/SE2017/050079—dated Apr. 12, 2017.

3GPP TR 23.770 v0.3.0; Technical Report; 3rd Generation Partnership Project; Technical Specification Group Services and System Aspects; Study on System Impacts of Extended DRX Cycle for Power Consumption Optimization (Release 13)—Jun. 2015.

3GPP TS 23.682 v13.4.0; Technical Specification; 3rd Generation Partnership Project; Technical Specification Group Services and System Aspects; Architecture enhancements to facilitate communications with packet data networks and applications (Release 13)—Dec. 2015.

PCT Written Opinion of the International Searching Authority for International application No. PCT/SE2017/050079—dated Apr. 12, 2017.

* cited by examiner

METHODS OF RELIABLE PAGING TRANSMISSION UNDER UE EDRX

PRIORITY

This nonprovisional application is a U.S. National Stage Filing under 35 U.S.C. § 371 of international Patent Application Serial No. PCT/SE2017/050079 filed Jan. 31, 2017, and entitled "METHODS OF RELIABLE PAGING TRANSMISSION UNDER UE EDRX" which claims priority to U.S. Provisional Patent Application No. 62/289,725 filed Feb. 1, 2016, both of which are hereby incorporated by reference in their entirety.

TECHNICAL FIELD

The present disclosure relates, in general, to wireless communications and, more particularly, to methods of reliable paging transmission under extended discontinuous reception.

BACKGROUND

Power consumption is an important consideration for user equipment (UEs) using a battery or an external power supply. Its importance increases with the continued growth of device populations and more demanding use cases. The importance can be illustrated by the following example scenarios. With respect to machine-to-machine (M2M) use cases (like sensors that run on battery), it is a major cost to on-site exchange (or charge) the batteries for a large number of devices, and the battery lifetime may even determine the device's lifetime if it is not foreseen to charge or replace the battery. Even for scenarios where UEs may consume power from an external power supply, it may be desirable to consume less power for energy efficiency purposes.

Enhancing discontinuous reception (DRX) operation, currently discussed in 3GPP, is a way to improve battery savings in the UE. DRX makes the UE reachable during pre-defined occasions without resulting in unnecessary signaling. As currently defined, DRX cycles in Long Term Evolution (LTE) can be at most 2.56 seconds, and thus would not allow for sufficient power savings for UEs that only need to wake-up infrequently (e.g., every few or tens of minutes) for data. Hence, DRX cycle extension is required in order to enable significant battery savings for such UEs. Furthermore, the DRX cycle can be set depending on the data delay tolerance and power saving requirements, thus providing a flexible solution for achieving significant UE battery savings.

Currently, 3GPP is defining enhanced-DRX (which may be interchangeably referred to as extended-DRX (eDRX) operation for UEs in CONNECTED mode in LTE and for UEs in IDLE mode in LTE and UMTS Terrestrial Radio Access (UTRA). In LTE, the eDRX in IDLE is based on the Hyper System Frame Number (H-SFN) concept.

DRX Configuration for Non-eDRX (Legacy) UE

In LTE, DRX has been introduced as one of the key solutions to conserve battery power in a mobile terminal. DRX is characterized by the following features. DRX is a per UE mechanism (as opposed to per radio bearer). It may be used in RRC_IDLE and RRC_CONNECTED modes. In RRC_CONNECTED mode, an eNodeB (eNB) or UE may initiate DRX mode when there are no outstanding/new packets to be transmitted and/or received. With respect to RRC_IDLE mode, 2G and 3G terminals use DRX in idle state to increase battery life time. High Speed Packet Access (HSPA) and LTE have introduced DRX also for connected state. In DRX, available DRX values are controlled by the network and start from non-DRX up to x seconds. Hybrid Automatic Repeat Request (HARD) operation related to data transmission is independent of DRX operation. The UE wakes up to read the Physical Downlink Control Channel (PDCCH) for possible retransmissions and/or Acknowledgement (ACK)/Negative Acknowledgement (NAK) signalling regardless of DRX. In the downlink (DL), a timer is used to limit the time the UE stays awake waiting for a retransmission.

When DRX is configured, the UE may be further configured with an "on-duration" timer. During the "on-duration" timer, the UE monitors the PDCCHs for possible allocations. When DRX is configured, periodic Channel Quality Indicator (CQI) reports can only be sent by the UE during an "active-time." Radio Resource Control (RRC) can further restrict periodic CQI reports so that they are only sent during the "on-duration. The eNodeB does not transmit packets to UE during the sleep mode when DRX is configured.

For UE in RRC_IDLE

A UE is set to DRX in idle mode after a prolonged time of air interface inactivity. DRX in idle mode may also be referred to as paging DRX (i.e., the time the mobile device can go to sleep between two paging messages that could contain a command for the UE to wake up again and change back to RRC_CONNECTED state).

FIG. 1 illustrates an example procedure to determine the IDLE DRX cycle in legacy UEs. In other words, FIG. 1 illustrates the DRX cycle configuration for non-eDRX (legacy) UEs. More particularly, FIG. 1 illustrates a signal flow between a UE 110, an eNB 115, and a mobility management entity (MME) 130. At step 1001, eNB 115 broadcasts a default DRX value via System Information Block 1 (SIB1) to UE 110. In some cases, at step 1002, UE 110 can provide a UE specific DRX value to MME 130 if UE 110 wants to have a shorter DRX than the default value. In the example of FIG. 1, this is accomplished using an ATTACH REQUEST.

At step 1003, upon triggering a paging for UE 110, MME 130 sends the UE specific DRX value together with the paging to eNB 115. In the example of FIG. 1, both UE 110 and eNB 115 know the default DRX value and the UE specific DRX value. At step 1004, UE 110 sets the final DRX cycle T to the shortest of the default DRX value and the UE specific DRX value. In cases where UE 110 does not provide a UE specific DRX value, UE 110 sets the final DRX cycle T to the default DRX value. Likewise, at step 1005 eNB 115 sets the final DRX cycle T to the shortest of the default DRX value and the UE specific DRX value. If the paging message received by eNB 115 at step 1003 does not include a UE specific DRX value, then eNB 115 sets the final DRX cycle T to the default DRX value.

One Paging Frame (PF) is one Radio Frame, which may contain one or multiple Paging Occasion(s) (PO). When DRX is used, the UE needs only to monitor one PO per DRX cycle.

For UE in RRC_CONNECTED

A number of definitions apply to DRX in Evolved UMTS Terrestrial Radio Access Network (E-UTRAN). The "on-duration" refers to the duration in DL subframes that the UE waits, after waking up from DRX, to receive PDCCH(s). If the UE successfully decodes a PDCCH, the UE stays awake and starts the inactivity timer. The "inactivity-timer" refers to the duration in DL subframes that the UE waits to successfully decode a PDCCH, from the last successful decoding of a PDCCH. If the UE does not successfully decode a PDCCH, the UE re-enters DRX. The UE shall restart the inactivity-timer following a single successful decoding of a PDCCH for a first transmission only (i.e., not for retransmissions).

The "active-time" refers to the total duration that the UE is awake. This includes the "on-duration" of the DRX cycle, the time the UE is performing continuous reception while the inactivity timer has not expired, and the time the UE is performing continuous reception while waiting for a DL retransmission after one HARQ Round Trip Time (RTT). Based on the above, the minimum active time is of length equal to on-duration, and the maximum is undefined (infinite).

Of the above parameters, the on-duration and inactivity-timer have fixed lengths. The active time, however, is of varying length based on, for example, scheduling decisions and UE decoding success. Only on-duration and inactivity-timer duration are signalled to the UE by the eNodeB. Furthermore, there is only one DRX configuration applied in the UE at any time, and the UE shall apply an on-duration on wake-up from DRX sleep.

FIG. 2 illustrates an example of DRX mode in LTE. Time 205 is illustrated on the X-axis, and periods where the UE is away 210 or asleep 215 are reflected on the Y-axis. DRX is triggered by means of an inactivity time known as DRX. As can be seen from FIG. 2, the UE activity time may be extended if PDCCH is received during ON Duration time. In the example of FIG. 2, at point 220 the UE successfully decodes PDCCH and starts inactivity timer 225 (shown in FIG. 2 as inactivity timer 225a). Subsequently, at point 230, the UE successfully decodes another PDCCH and resets inactivity timer 225 (shown in FIG. 2 as inactivity timer 225b). Inactivity timer 225b expires at point 235, at which time DRX cycle 240 starts. As shown in FIG. 2, DRX cycle 240 consists of periods of time during which the UE is awake followed by periods of sleep.

In some cases, it may also be shortened by a Medium Access Control (MAC) DRX command, upon reception of which the UE stops onDurationTimer and drx-Inactivity-Timer.

If PDCCH has not been successfully decoded during the on-duration, the UE shall follow the DRX configuration (i.e., the UE can enter DRX sleep if allowed by the DRX configuration). This applies also for the sub-frames where the UE has been allocated predefined resources. If the UE successfully decodes a PDCCH for a first transmission (e.g., at point 220 in the example of FIG. 2), the UE shall stay awake and start the inactivity timer (e.g., inactivity timer 225a), even if a PDCCH is successfully decoded in the sub-frames where the UE has also been allocated predefined resources, until a MAC control message tells the UE to re-enter DRX, or until the inactivity timer expires.

In both cases, the DRX cycle that the UE follows after re-entering DRX is given by the following rules. First, if a short DRX cycle is configured, the UE first follows the short DRX cycle. After a longer period of inactivity, the UE follows the long DRX cycle. If short DRX cycle is used, the long cycle will be a multiple of the short cycle. Second, durations for long and short DRX are configured by the RRC. The transition between the short and long DRX cycles is determined by the eNB MAC commands or by the UE based on an activity timer. If a command is received and short DRX is configured, the UE will (re)start drxShortCycleTimer and use the Short DRX Cycle. Otherwise, long DRX will be used. In other cases, the UE follows the long DRX cycle directly.

A variety of parameters may be configured by the network. As one example, the onDurationTimer can be (in PDCCH subframes): 1, 2, 3, 4, 5, 6, 8, 10, 20, 30, 40, 50, 60, 80, 100, and 200. As another example, the drx-Inactivity-Timer can be (in PDCCH subframes): 1, 2, 3, 4, 5, 6, 8, 10, 20, 30, 40, 50, 60, 80, 100, 200, 300, 500, 750, 1280, 11120, 2560. In some cases, a specific value may also be configured if the UE supports In-Device Co-Existence (IDC). As still another example, the longDRX-CycleStartOffset (in subframes) can, depending on the cycle length, be up to 2559. As yet another example, theshortDRX-cycle can be (in subframes): 2, 5, 8, 10, 16, 20, 32, 40, 64, 80, 128, 160, 256, 320, 52, 640.

eDRX Configuration in LTE

For UE in RRC_IDLE

Like for DRX, eDRX configuration parameters are "negotiated" between UE and the network via NAS. Similar to the example described above with respect to FIG. 1, the UE may include eDRX parameters in an ATTACH REQUEST message or a TRACKING AREA UPDATE REQUEST message. The network shall include eDRX parameters (e.g., eDRX cycle length, paging window length, etc.) in the ATTACH ACCEPT or TRACKING AREA UPDATE ACCEPT messages, respectively, if the UE included eDRX parameters (e.g., eDRX cycle) in the corresponding REQUEST message and the network supports and accepts the use of eDRX. Examples of the eDRX parameters include eDRX cycle length and paging transmission window (PTW) length.

The UE is configured with a PTW assigned by an MME and provided to the UE via Non-Access Stratum (NAS), for example as described in 3GPP TS 24.301, v13.4.0. The PTW has a number of characteristics. For example, the PTW is characterized by a Paging H-SFN (PH). The PH is calculated according to the formula:

$$\text{H-SFN mod TeDRX} = (\text{UE\_ID mod TeDRX}), \quad (1)$$

where UE_ID is IMSI mod 1024, and TeDRX is the eDRX cycle of the UE (e.g., TeDRX=1, 2, . . . , 256 in hyperframes) and configured by upper layers. As another example, the PTW is characterized by a PTW start. The PTW start is calculated within PH. The start of PTW is uniformly distributed across 4 paging starting points within the PH. PW_start denotes the first radio frame of the PH that is part the paging window and has System Frame Number (SFN) satisfying the following equation:

$$\text{SFN} = 256 * \text{ieDRX}, \text{ where } \text{ieDRX} = \text{floor}(\text{UE\_ID}/ \text{TeDRX},H) \text{mod } 4, \quad (2)$$

where: PW_end is the last radio frame of the PW and has SFN satisfying the following equation:

$$\text{SFN} = (\text{PW\_start} + L*100 - 1) \text{mod } 1024, \quad (3)$$

where: L=Paging Window length (in seconds) configured by upper layers. As another example, the PTW is characterized by a PTW length, which is configured by higher layers. Within a PTW, the UE is further configured with a legacy DRX (described in more detail below with respect to FIG. 4).

FIG. 3 illustrates the H-SFN cycle. H-SFN is defined as a new frame structure on top of the legacy SFN structure, where each H-SFN value corresponds to a cycle of 1024 legacy frames and one H-SFN cycle 305 contains 1024 hyper-SFNs 310 (10 bits). All MMEs and eNBs have the same H-SFN, and cells broadcast their H-SFN via SIB1 or SIB1bis.

The PTW is assigned by the MME and provided to the UE via NAS during attach and/or tracking area update. The beginning of PTW is calculated by a pre-defined formula.

FIG. 4 illustrates the relation between H-SFN, paging window, and eDRX periodicity. More particularly, FIG. 4 illustrates a H-SFN cycle 305 that includes 1024 hyper-SFNs 310, of which hyper-SFNs 310a-310g are shown. In the example of FIG. 4, hyper-SFNs 310d and 310e are PHs. Within PH 310d are 1024 legacy frames, of which frames Y, Y+$T_{DRX}$, and Y+$N_cT_{DRX}$ are on durations of a normal (i.e., legacy) DRX cycle. In the example of FIG. 4, the paging window runs from frame Y to Y+$N_cT_{DRX}$.

For UE in RRC_CONNECTED

The eDRX procedure for RRC_CONNECTED UE is the same as the legacy case, except that two new DRX cycles have been added: 5.12 seconds and 10.28 seconds.

eDRX in UTRA

FIG. 5 illustrates an example of eDRX in UTRA. In UTRA, eDRX has been specified only for IDLE state. In eDRX for UTRA, the DRX cycle is prolonged to some seconds, which is much longer than the legacy DRX cycles. As shown in FIG. 5, the DRX cycle 505 consists of a long sleep period 510, then the UE wakes up to a PTW 515. Within each, PTW 515, there are N_PTW paging occasions 520 with the legacy PS DRX cycle 525.

According to existing approaches, the network node transmits paging to the UEs during the paging PTW of the eDRX cycle configured in cells in which the paging is sent. The eDRX cycle length, however, can be very long (e.g., up to more than 40 minutes and even up to hours in future). This means the PTW where paging can be sent occurs very seldom. Any loss of paging in a particular PTW means that the UE has to wait for the next occurrence of the PTW to receive the paging. There is, however, no guarantee that the UE will correctly receive the paging sent by the network node in the next or subsequent occurrences of the PTW. As a result, the paging reception at the UE can be delayed for an unpredictable time. This in turn may significantly degrade the performance of starting an incoming call, and may even lead to call blocking. In addition, the UE may also miss other critical information sent by the network node via paging message (e.g., a change or the update of the system information (SI)). This in turn will degrade the UE mobility performance (e.g., cell reselection), which relies on system parameters sent to the UE via the SI.

SUMMARY

To address the foregoing problems with existing solutions, disclosed is a method in a network node. The method comprises obtaining a length of a paging transmission window within a discontinuous reception cycle of a first type configured in a first cell. The method comprises obtaining at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type. The method comprises determining whether a paging message can be transmitted in the first cell based on the obtained at least one of the number of discontinuous reception cycles of the second type remaining within the paging transmission window with respect to the reference time in the first cell and the amount of time remaining within the paging transmission window starting from the reference time.

In certain embodiments, the first type of discontinuous reception may be extended discontinuous reception; and the second type of discontinuous reception may be legacy discontinuous reception. In certain embodiments, the method may comprise indicating a result of the determination to at least one other node. In certain embodiments, the method may transmitting at least one paging message outside the paging transmission window.

In certain embodiments, the method may comprise transmitting the paging message in the first cell upon determining at least one of: that the number of discontinuous reception cycles of the second type remaining within the paging transmission window is equal to or larger than a threshold value; and that the amount of time remaining within the paging transmission window starting from the reference time is equal to or larger than a time threshold value. The method may comprise transmitting one or more redundant copies of the transmitted paging message.

In certain embodiments, the method may comprise upon determining that the number of discontinuous reception cycles of the second type remaining within the paging transmission window is less than a threshold value, performing one of: not transmitting the paging message in the paging transmission window; deferring transmission of the paging message until a subsequent paging transmission window; transmitting the paging message in the paging transmission window with a transport format that is more robust than a transport format threshold value; and transmitting the paging message in the paging transmission window with a transmission power that is above a transmission power threshold.

In certain embodiments, the method may comprise upon determining that the paging message cannot be transmitted in the first cell, adapting one or more of: the paging transmission window; the discontinuous reception cycle of the first type; and the discontinuous reception cycle of the second type. The method may comprise indicating a configuration for the paging message resulting from the adaptation to at least one other node.

Also disclosed is a network node. The network node comprises processing circuitry. The processing circuitry is configured to obtain a length of a paging transmission window within a discontinuous reception cycle of a first type configured in a first cell. The processing circuitry is configured to obtain at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type. The processing circuitry is configured to determine whether a paging message can be transmitted in the first cell based on the obtained at least one of the number of discontinuous reception cycles of the second type remaining within the paging transmission window with respect to the reference time in the first cell and the amount of time remaining within the paging transmission window starting from the reference time.

Also disclosed is a method in a wireless device. The method comprises obtaining a length of a paging transmission window within a discontinuous reception cycle of a first type configured in a first cell. The method comprises obtaining at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type. The method comprises determining whether a paging message is expected to be received in the first cell based on the obtained at least one of the number of discontinuous reception cycles of the second type remaining within the paging transmission window with respect to the reference time in the first cell and the amount of time remaining within the paging transmission window starting from the reference time.

In certain embodiments, the first type of discontinuous reception may be extended discontinuous reception; and the second type of discontinuous reception may be legacy discontinuous reception. In certain embodiments, the method may comprise receiving at least one paging message outside the paging transmission window.

In certain embodiments, the method may comprise upon determining that the paging message is expected to be received in the first cell, adjusting one or more receiver properties to facilitate receiving the paging messages. The method may comprise determining a number of redundant paging messages expected to be received during the paging transmission window. The method may comprise: receiving the paging message; and storing the received paging message for combining with one or more subsequently received redundant paging messages.

In certain embodiments, the method may comprise determining that the paging message is expected to be received in the first cell if the number of discontinuous reception cycles of the second type remaining within the paging transmission window is equal to or larger than a threshold value or the amount of time remaining within the paging transmission window starting from the reference time is equal to or larger than a time threshold value. The wireless device may be required to receive the paging message and one or more redundant transmissions of the paging message if sent before at least one of a predefined period of time before an end of the paging transmission window and a predefined number of discontinuous reception cycles of the second type before the end of the paging transmission window.

In certain embodiments, the method may comprise determining that a paging message is not expected to be received if the number of discontinuous reception cycles of the second type remaining within the paging window is less than a threshold value. In certain embodiments, the method may comprise determining that a paging message is expected to be received using a transport format that is more robust than a transport format threshold if the number of discontinuous reception cycles of the second type remaining within the paging window is less than a threshold value.

Certain embodiments of the present disclosure may provide one or more technical advantages. As one example, certain embodiments may ensure that the wireless device is able to successfully receive paging messages even if the wireless device is configured with very long eDRX cycle length (e.g., in order of minutes). As another example, certain embodiments may enable the network node to successfully transmit the paging messages to the wireless device within the same paging transmission window of the eDRX cycle. As yet another example, certain embodiments may allow for call dropping to be avoided or at least minimized. As still another example, the overall wireless device mobility performance (and in particular the wireless device cell reselection performance) may be enhanced. In some cases, this is due to the fact that the probability of missing any change in the system information indicated via paging message is significantly reduced. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
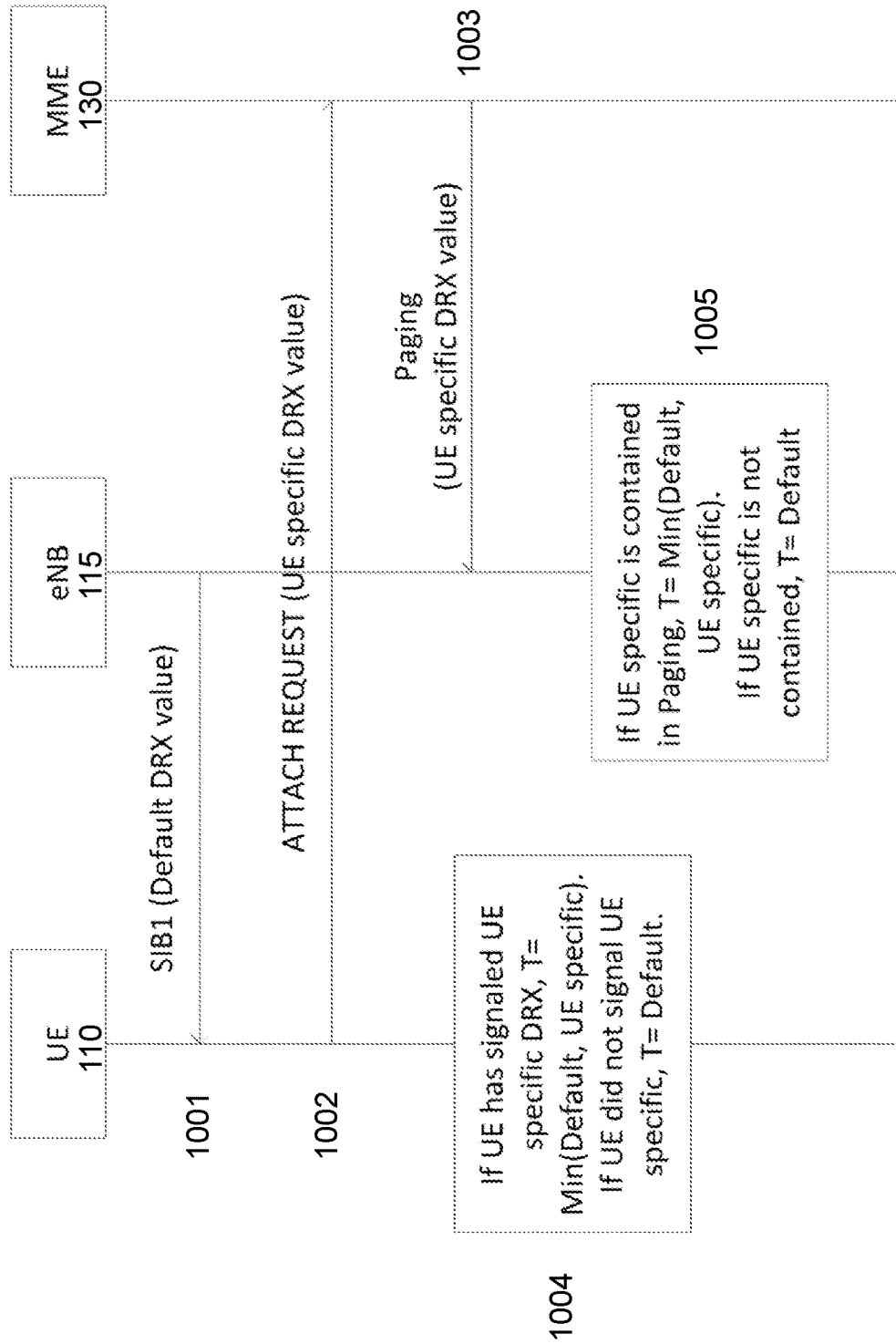
FIG. 1 illustrates a procedure to determine the IDLE DRX cycle in legacy UEs.
Figure 2:
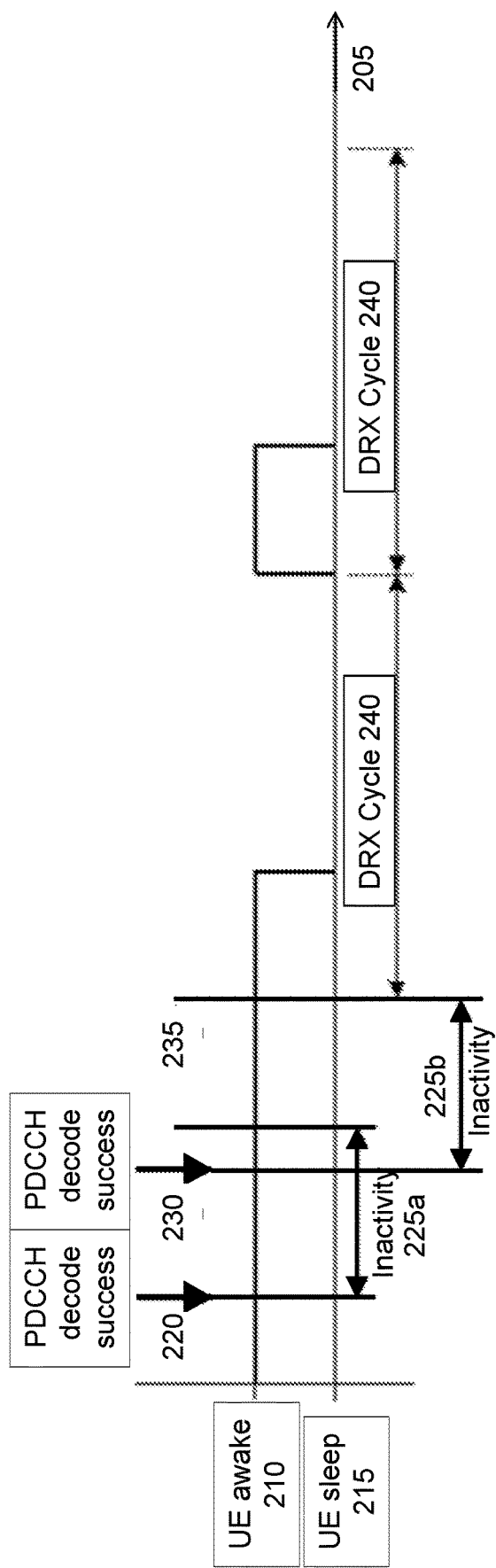
FIG. 2 illustrates DRX mode in LTE.
Figure 3:
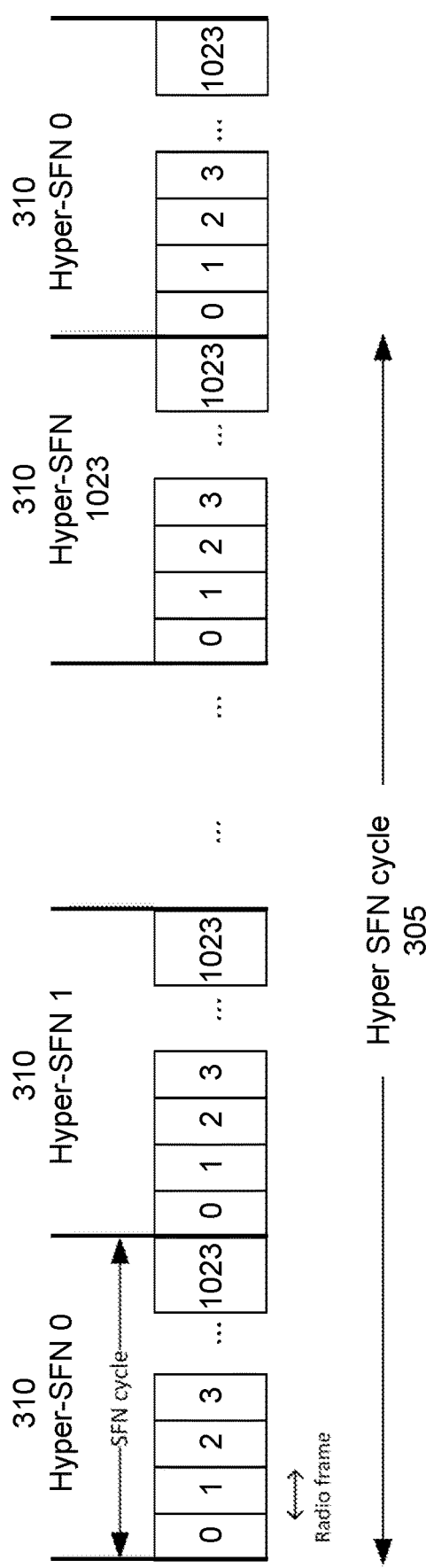
FIG. 3 illustrates the H-SFN cycle.
Figure 4:
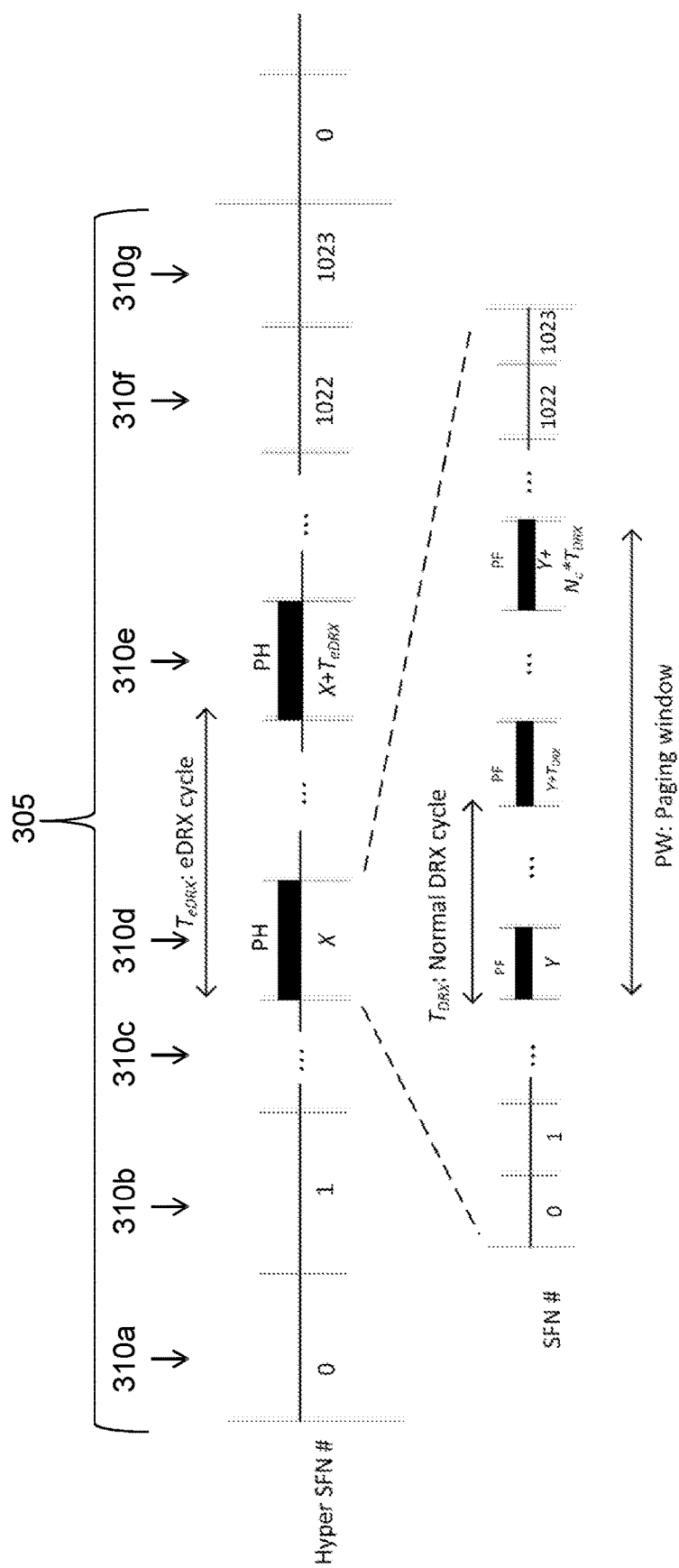
FIG. 4 illustrates the relation between H-SFN, paging window, and eDRX periodicity.
Figure 5:
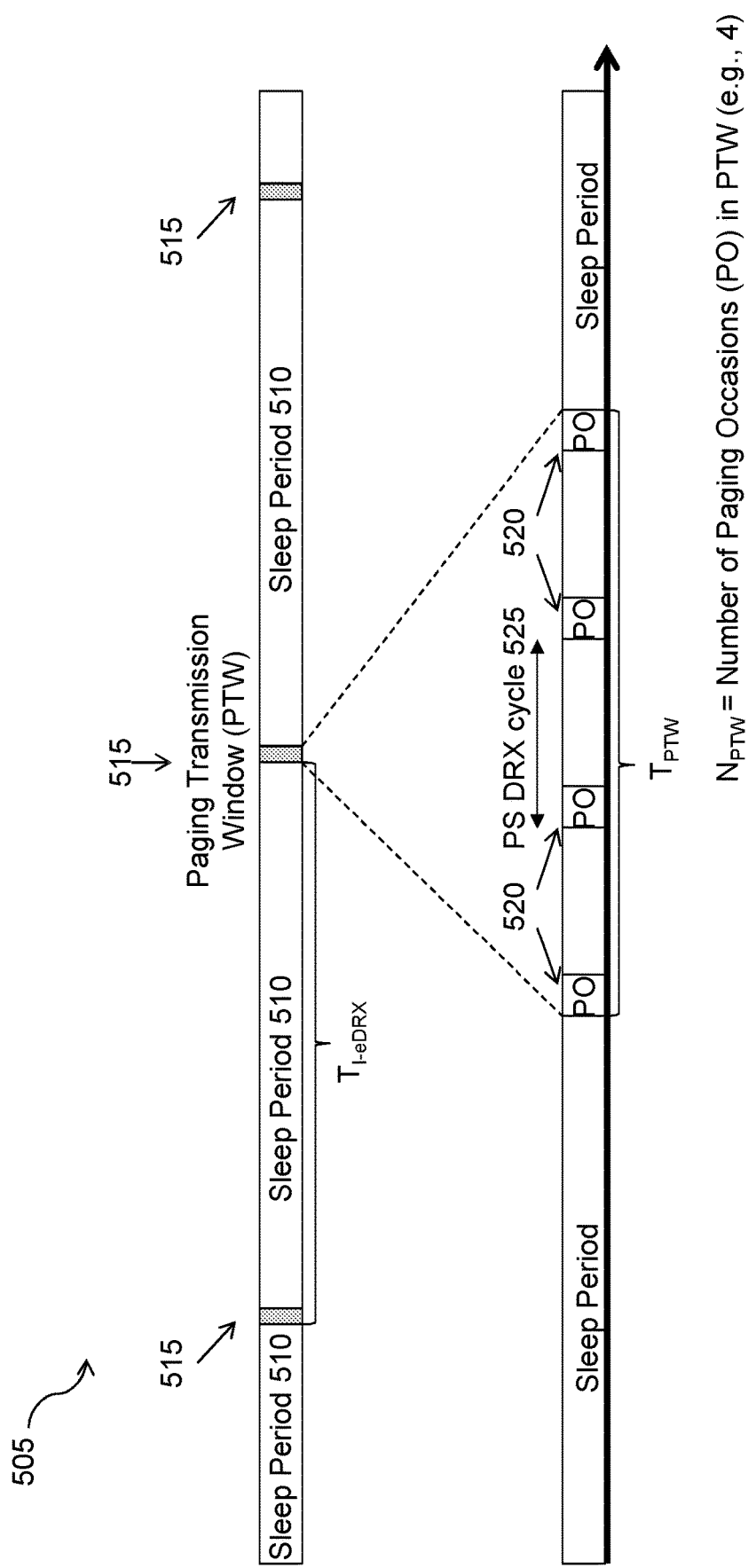
FIG. 5 illustrates eDRX in UTRA.

As described above, in some cases the eDRX cycle length can be very long, resulting in PTW in which paging can be sent occurring infrequently. Any loss of paging in a particular PTW means that the UE has to wait for the next occurrence of the PTW to receive the paging. There is, however, no guarantee that the UE will correctly receive the paging sent by the network node in the next or subsequent occurrences of the PTW, which means the paging reception at the UE can be delayed for unpredictable time. This in turn may significantly degrade the performance of starting an incoming call, and may even lead to call blocking. The UE may also miss other critical information sent by the network node via paging message, which may degrade the UE mobility performance that relies on system parameters sent to the UE via the SI.

The present disclosure contemplates various embodiments that may address these and other deficiencies of existing approaches. For example, methods in a UE and a network node are described that enable transmission of a paging message in a cell with sufficient reliability within the same PTW. This in turn ensures that the UE is able to receive and correctly decode the paging message, thereby enhancing UE performance and mobility.

According to one example embodiment, a method in a network node is disclosed. The network node obtains a length of a paging transmission window within a discontinuous reception cycle of a first type configured in a first cell. The network node obtains at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type. The network node determines whether a paging message can be transmitted in the first cell based on the obtained at least one of the number of discontinuous reception cycles of the second type remaining within the paging transmission window with respect to the reference time in the first cell and the amount of time remaining within the paging transmission window starting from the reference time.

According to another example embodiment, a method in a wireless device is disclosed. The wireless device obtains a length of a paging transmission window within a discontinuous reception cycle of a first type configured in a first cell. The wireless device obtains at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type. The wireless device determines whether a paging message is expected to be received in the first cell based on the obtained at least one of the number of discontinuous reception cycles of the second type remaining within the paging transmission window with respect to the reference time in the first cell and the amount of time remaining within the paging transmission window starting from the reference time.

Certain embodiments of the present disclosure may provide one or more technical advantages. As one example, certain embodiments may ensure that the wireless device is able to successfully receive paging messages even if the wireless device is configured with very long eDRX cycle length (e.g., in order of minutes). As another example, certain embodiments may enable the network node to successfully transmit the paging messages to the wireless device within the same paging transmission window of the eDRX cycle. As yet another example, certain embodiments may allow for call dropping to be avoided or at least minimized. As still another example, the overall wireless device mobility performance (and in particular the wireless device cell reselection performance) may be enhanced. In some cases, this is due to the fact that the probability of missing any change in the system information indicated via paging message is significantly reduced. Other advantages may be readily apparent to one having skill in the art. Certain embodiments may have none, some, or all of the recited advantages.

Figure 6:
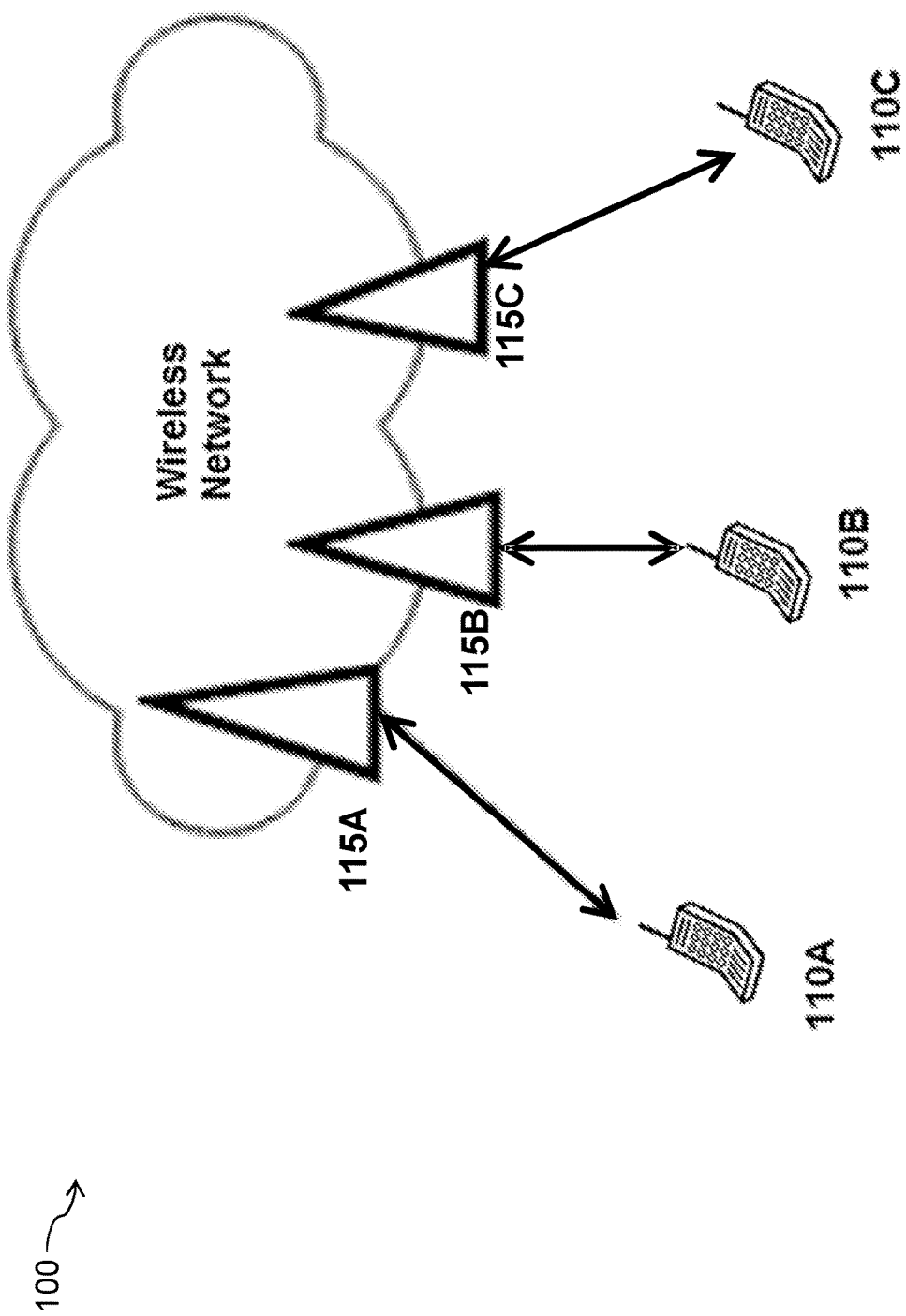
FIG. 6 is a schematic diagram of a wireless communication network, in accordance with certain embodiments.

FIG. 6 is a schematic diagram of a wireless communication network 100, in accordance with certain embodiments. Network 100 includes one or more UE(s) 110 (which may be interchangeably referred to as wireless devices 110 or simply device 110) and network node(s) 115 (which may be interchangeably referred to as eNodeBs (eNBs) 115). UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have D2D capability. Thus, UEs 110 may be able to receive signals from and/or transmit signals directly to another UE. For example, UE 110A may be able to receive signals from and/or transmit signals to UE 110B.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be performed by network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface. For example, network nodes 115A and 115B may interface over an X2 interface.

In some embodiments, a non-limiting term "UE" is used. As described above, example embodiments of network 100 may include one or more UEs 110, and one or more different types of network nodes capable of communicating (directly or indirectly) with UEs 110. UEs 110 described herein can be any type of wireless device capable of communicating with network nodes 115 or another UE over radio signals. UE 110 may also be a radio communication device, target device, device-to-device (D2D) UE, machine-type-communication UE or UE capable of machine to machine communication (M2M), a sensor/actuator equipped with UE, iPad, Tablet, mobile terminals, smart phone, laptop embedded equipped (LEE), laptop mounted equipment (LME), USB dongles, Customer Premises Equipment (CPE), or any other suitable device.

Also in some embodiments generic terminology "network node", is used. It can be any kind of network node which may comprise of a radio network node such as base station (BS), radio base station, base transceiver station, base station controller, network controller, evolved Node B (eNB), gNB, Node B, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., $3^{rd}$ party node, a node external to the current network), etc.

The term "node" used herein may be used to denote a UE or a network node.

Example embodiments of UEs 110, network nodes 115, and other network nodes (such as radio network controller or core network node) are described in more detail with respect to FIGS. 9-13 below.

The various embodiments described herein are applicable to single carrier as well as to multicarrier or carrier aggregation (CA) operation of the UE in which the UE is able to receive and/or transmit data to more than one serving cells. CA may be interchangeably referred to "multi-carrier system," "multi-cell operation," "multi-carrier operation," "multi-carrier" transmission and/or reception. In CA, one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably referred to as primary cell (PCell) or primary serving cell (PSC). Similarly, the secondary serving cell is interchangeably referred to as secondary cell (SCell) or secondary serving cell (SSC).

Although FIG. 6 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a LTE network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, the various embodiments described herein may apply to any RAT or their evolution, including NX, 5G, LTE, LTE Frequency Division Duplex (FDD), LTE Time Division Duplex (TDD), LTE-Advanced, Narrow Band Internet-of-Things (NB-IOT), UTRA, UMTS, HSPA, GSM, cdma2000, WiMax, WiFi, short-range communication RAT, narrow band RAT, RAT for 5G, another suitable radio access technology, or any suitable combination of one or more radio access technologies.

Any two or more embodiments described herein may be combined in any way with each other. Although the various embodiments may be described for paging channel and paging messages, this is for purposes of example only. The present disclosure contemplates that the various embodiments described herein for both network nodes and wireless devices (e.g., UE) may also be adapted for another channel type that needs to be transmitted within a PTW and may require transmission repetitions to achieve a certain detection and/or quality level.

As used herein, the term "signaling" may refer to any of the following non-limiting examples: high-layer signaling (e.g., via RRC), lower-layer signaling (e.g., via a physical control channel or a broadcast channel), or any suitable combination thereof. The signaling may be implicit or explicit. The signaling may further be unicast, multicast or broadcast. The signaling may also be directly to another node or via a third node.

As used herein, the term "eDRX cycle" may be interchangeably referred to as a first DRX cycle (DRX1) or a first type of DRX cycle. As used herein, the term "legacy DRX cycle" may be interchangeably referred to as a second DRX cycle (DRX2) or a second type of DRX cycle. The PTW, during which the UE can receive paging or read SI, occurs once every DRX1. The PTW may also be interchangeably referred to as a first paging occasion or a paging occasion of the DRX1. Within each PTW, the UE is configured with at least one DRX2. The lengths of DRX1 and DRX2 are related by the following relation: DRX1>DRX2.

In some cases, network node 115 transmits one or more paging messages to one or more UE 110 in at least a first cell (cell1) during a PTW. Network node 115 may also transmit one or more paging messages to one or more UEs 110 in a plurality of cells (e.g., in two or more cells) belonging to a track area.

As used herein, the term "paging message" may comprise an indication, an alert message, data or any type of higher-layer information transmitted to UE 110. In certain embodiments, the paging message may contain information about an incoming call (i.e., a network originated call). In certain embodiments, the paging message may contain information about any change or modification of any type of broadcast or system information in a cell. In certain embodiments, the paging message may include broadcast or system information in a cell.

The paging message may be transmitted to a UE 110 in any suitable manner. As one non-limiting example, the paging message may be transmitted to a UE 110 on one or more physical channels. Examples of such physical channels include, but are not limited to, data channel (e.g., Physical Downlink Shared Channel (PDSCH), Machine-Type-Communication (MTC)-Physical Downlink Shared Channel (M-PDSCH), etc.), control channel (e.g., Physical Downlink Control Channel (PDCCH), Enhanced-Physical Downlink Control Channel (E-PDCCH), MTC-Physical Downlink Control Channel (M-PDCCH), etc.), broadcast channel (Physical Broadcast Channel (PBCH), MTC-Physical Broadcast Channel (M-PBCH), etc.) or any other suitable channel.

In certain embodiments, the terms "UE mobility" or "cell change" are used. These may comprise, for example, one or more of: changing a cell (e.g., to camp on or a serving cell, where the serving cell may also be primary, secondary, etc.); changing a carrier frequency (e.g., to camp on a serving carrier frequency, where the serving carrier frequency may also be primary, secondary, etc.); changing a frequency band; changing RAT (to camp on or a serving RAT, where the serving RAT may also be primary, secondary, etc.); performing handover in UE CONNECTED state; and performing cell selection/reselection in UE IDLE state.

In certain embodiments, a method in a network node 115 for reliable transmission of paging message under eDRX operation is disclosed. As described above, network node 115 obtains a length of a PTW within a DRX cycle of a first type configured in a first cell. The first type of DRX may be eDRX.

Network node 115 may obtain the length of the PTW within the DRX cycle of the first type configured in the first cell in any suitable manner. As one example, network node 115 may determine the length of the PTW by retrieving from its memory information related to the configured eDRX cycle. As another example, network node 115 may receive from another network node information related to the eDRX cycle configured in the first cell. As still another example, network node 115 may determine the PTW length based on a pre-defined rule. As yet another example, network node 115 may adaptively configure the PTW length. As a particular example, network node 115 may determine a length of PTW within an eDRX cycle (also known as a first DRX cycle (DRX1)) configured in a first cell.

The information related to PTW length may comprise any suitable information. For example, the information related to PTW length may include one or more of: a length of PTW in time (e.g., X ms, Y seconds, Z subframes, etc.); a number of DRX cycles of a second type (e.g., legacy DRX cycles) (i.e., number of DRX2) (e.g., Z number of DRX2, each of 80 length (i.e., Z×80 ms)); a percentage or ratio of PTW duration with respect to eDRX cycle length (e.g., duration of PTW length/eDRX cycle length).

Network node 115 obtains at least one of a number of DRX cycles of a second type (e.g., legacy DRX cycles) remaining within the PTW with respect to a reference time in the first cell and an amount of time remaining within the PTW starting from the reference time. A DRX cycle of the second type may be shorter than the DRX cycle of the first type.

Network node 115 may obtain the at least one of a number of DRX cycles of the second type (e.g., legacy DRX cycles) remaining within the PTW with respect to a reference time in the first cell and an amount of time remaining within the PTW starting from the reference time in any suitable manner. As one example, network node 115 may determine at least a parameter N0, wherein N0 is a number of legacy DRX cycles (i.e., DRX2) remaining within the PTW in the first cell starting from a certain reference time (T0). As another example, network node 115 may determine the remaining time (T1) within the PTW in the first cell starting from a certain reference time (T0). The time, T1, may contain N0 DRX2.

Network node 115 may determine the parameters N0 and/or T1 in any suitable manner. For example, network node 115 may determine the parameters N0 and/or T1 based on information related to DRX2 configured within the PTW. The information about the configured DRX2 may be determined in any suitable manner. For example, the information about the configured DRX2 may be determined from any one or more of the following: information about currently configured DRX2 stored in the network node; information received from another network node; and pre-defined information or rule(s) (for example based on any of the following pre-defined relations: between DRX1 and DRX2, between DRX1 and PTW, and between DRX1, DRX2 and PTW).

The reference time parameter T0 can be any one or more of the following: a time instance when network node 115 decides to transmit the paging message in the first cell; a time instance when network node 115 has received a paging message from a core network node for transmission over a radio interface in the first cell; and a time instance at which or after which, network node 115 plans to actually transmit the paging message in the first cell.

Network node 115 determines whether a paging message can be transmitted in the first cell based on the obtained at least one of the number of DRX cycles of the second type remaining within the PTW (e.g., N0) with respect to the reference time (T0) in the first cell and the amount of time (T1) remaining within the PTW starting from the reference time (T0). Network node 115 may determine whether a paging message can be transmitted in the first cell in any suitable manner. As one example, network node 115 may determine whether a paging message can be transmitted in the first cell by comparing N0 with a threshold (Nt). The threshold, Nt, may be defined in any suitable manner. For example, the threshold, Nt, can be pre-defined, autonomously determined by network node 115 or received from another network node. As one non-limiting example, the minimum value of Nt can be 2, and the typical value of Nt can be 3 or 4. As another example, network node 115 may determine whether a paging message can be transmitted in the first cell by further (or alternatively) comparing T1 with a time threshold (Tt).

In some cases, network node 115 may inform the UE 110 about the result of its determination. For example, network node 115 may indicate, implicitly or explicitly, its decision to at least one other node (e.g., to a network node, one or more UEs, via unicast, multicast or broadcast, via any interface such as radio or cable).

The threshold values (e.g., Nt, Tt) may be based on any suitable criteria or combination of criteria. As one example, the value of Nt and Tt may be based on DRX2 length. In some cases, a larger value of Nt may be used for a smaller length of DRX2, and a larger value of Tt may be used for a longer DRX2. Examples of smaller and larger values of Nt are 2 and 5, respectively. Examples of smaller and larger values of DRX2 length are 40 ms and 640 ms, respectively. As another example, the value of Nt and Tt may be based on cell size. In some cases, a larger value of Nt or Tt may be used in larger cells and a smaller value of Nt or Tt may be used in smaller cells. As still another example, the value of Nt and Tt may be based on radio conditions. In some cases, a larger value of Nt or Tt may be used in difficult radio conditions and a smaller value of Nt or Tt may be used in favorable radio conditions. Examples of difficult radio conditions include, for example, when: a UE Doppler frequency or speed is above a threshold; a delay spread is larger than a threshold, etc. Examples of favorable radio conditions include, for example, the conditions in the requirements for normal coverage level, while difficult conditions may be for enhanced coverage level. In some cases, the value of Nt and Tt may be based on any suitable combination of the above.

In certain embodiments, based on the outcome of the comparison between N0 and Nt and/or between T1 and Tt, network node 115 determines whether or not to transmit the paging message in at least the first cell. In certain embodiments, network node 115 may execute or perform one or more operations based on the determination of whether or not to transmit the paging message in at least the first cell. As a first example, network node 115 may transmit the paging message in the current PTW provided at least N0≥Nt.

As a second example, if at least N0≥Nt, then during the available time within the same PTW, network node 115 may further transmit one or more redundant copies of the initially transmitted paging messages. For example, assume that N0=3 and Nt=3 at reference time T0. In this example, network node 115 transmits the first paging message during the first available DRX ON period of DRX2 after T0, and also transmits two redundant versions of the first paging message in the next two consecutive DRX ON periods of the DRX2. This in turn ensures that by the virtue of combining the initial paging message and the redundancy versions of the paging messages, UE 110 is able to correctly receive the paging message with a high probability and reliability within the same PTW;

As a third example, network node 115 may transmit the paging message in the current PTW provided any one or more of these conditions is met: N0≥Nt, and T1≥Tt.

As a fourth example, if any of these conditions is met: N0≥Nt, and T1≥Tt, then during the available time within the same PTW, network node 115 may further transmit one or more redundant copies of the initially transmitted paging messages. This will enhance the reliability of the reception of the paging message at the UE as described in the third example above.

As a fifth example, if at least N0<Nt, then network node 115 may not transmit the paging message in the current PTW.

As a sixth example, if at least N0<Nt, then network node 115 may not transmit the paging message in the current PTW and instead defer the transmission of the paging message to a PTW of a future occurrence of the eDRX cycle length (e.g., in the next PTW).

As a seventh example, if N0<Nt and T1<Tt, then network node 115 may not transmit the paging message in the current PTW.

As an eighth example, if N0<Nt and T1<Tt, then network node 115 may not transmit the paging message in the current PTW and instead defer the transmission of the paging message to a PTW of a future occurrence of the eDRX cycle length (e.g. in the next PTW).

As a ninth example, if at least N0<Nt, then network node 115 may not transmit the paging message in the current PTW.

As a tenth example, if at least N0<Nt, then network node 115 may transmit the paging message in the current PTW by encoding the message with a certain transport format (TF) that is robust enough. For example, the transport block or data block may be transmitted with a transport format with modulation order (e.g., QPSK) below a threshold (e.g., Q16QAM) and/or with a coding rate that is below a threshold (e.g., below 1/2). The robust TF ensures that a UE 110 is able to receive the paging message in one or fewer transmission attempts.

As an eleventh example, if at least N0<Nt, then network node 115 may transmit the paging message in the current PTW with a transmit power that is above a certain threshold (e.g., 3 dB higher than when N0≥Nt). The higher transmission power (i.e., boosted Tx power) ensures that a UE 110 is able to receive the paging message in one or fewer transmission attempts.

As a twelfth example, if network node 115 is unable to transmit the paging message (e.g., if N0<Nt), then network node 115 may adapt one or more parameters related to UE DRX operation. Examples of such parameters include, but are not limited to, DRX1, DRX2 and the PTW. As one non-limiting example, network node 115 may shorten DRX2 length. This will increase the value of the parameter N0 to a larger value (i.e., N0' where N0'>N0 and also N0'≥Nt). This will allow network node 115 to transmit the paging message and also one or more copies of the initial paging message to a UE 110 within the same PTW.

As a thirteenth example, network node 115 may transmit the paging message outside the PTW. For example, network node 115 may transmit the paging message before or after the PTW.

In some cases, network node 115 may inform the UE 110 about the adaptive values of any one or more of DRX1, DRX2 and PTW in any suitable manner. Indicating, implicitly or explicitly, the resulting configuration to at least one other node (e.g., to a network node, one or more UEs, via unicast, multicast or broadcast, via any interface such as radio or cable). For example, network node 115 may inform the UE 110 about the adaptive values of any one or more of DRX1, DRX2 and PTW in a control channel (e.g., PDCCH, M-PDCCH). In some cases, two or more sets of adaptive parameters may be pre-defined or previously configured at UE 110 by higher layers (e.g., RRC). In such a scenario, network node 115 may only send an identifier of one of the adaptive set of parameters currently adapted.

According to one example embodiment, network node 115 may be required or may be expected to transmit the paging message at least some time T before the end of the PTW or at least N DRX cycles (e.g., N=2, which may accommodate one first transmission and two repetitions/redundancy versions). This may also be specified as a condition for a UE requirement (e.g., when UE 110 is configured with eDRX_IDLE cycle, UE 110 shall not miss any paging in a PTW provided the paging is sent in at least [N] DRX cycles before the end of that PTW).

In certain embodiments a method in a wireless device 110 (or UE 110) for reliable reception of paging under eDRX operation is disclosed. As described above, UE 110 obtains a length of a PTW within a DRX cycle of a first type configured in a first cell. The first type of DRX may be eDRX. In such a scenario, UE 110 obtains the length of the PTW associated with the eDRX cycle configured in at least the first cell. UE 110 may obtain the length of the PTW associated with the eDRX cycle in any suitable manner. As one example, UE 110 may determine the length of the PTW within the DRX cycle of the first type by retrieving from its memory information related to the configured eDRX cycle. As another example, UE 110 may receive information related to the configured eDRX cycle from a network node 115 (e.g., as part of the information related to the eDRX cycle configured in the first cell). As still another example, UE 110 may receive information related to the configured eDRX cycle from another UE.

As described above, the information related to PTW length may comprise any suitable information. For example, the information related to PTW length may include one or more of: a length of PTW in time (e.g., X ms, Y seconds, Z subframes, etc.); a number of DRX cycles of a second type (e.g., legacy DRX cycles) (i.e., number of DRX2) (e.g., Z number of DRX2, each of 80 length (i.e. Z×80 ms)); a percentage or ratio of PTW duration with respect to eDRX cycle length (e.g., duration of PTW length/eDRX cycle length). UE 110 obtains at least one of a number of DRX cycles of a second type remaining within the PTW with respect to a reference time in the first cell and an amount of time remaining within the PTW starting from the reference time. The second type of DRX may be legacy DRX. In such a scenario, the DRX cycle of the second type is shorter than the discontinuous reception cycle of the first type.

UE 110 may obtain the at least one of a number of DRX cycles of the second type remaining within the PTW with respect to a reference time in the first cell and the amount of time remaining within the PTW starting from the reference time in any suitable manner. As one example, UE 110 may determine a number (N0) of legacy DRX cycles (i.e., DRX2) remaining within the PTW in the first cell starting from a certain reference time (T0). As another example, UE 110 may (in addition or alternatively) determine the remaining time (T1) within the PTW in cell1 starting from a certain reference time (T0). The time, T1, may contain N0 number of DRX2.

UE 110 may determine the parameters N0 and/or T1 based on any suitable criteria. For example, UE 110 may determine the parameters N0 and/or T1 based on information related to DRX2 configured within the PTW. The information about the configured DRX2 may be determined in any suitable manner. For example UE 110 may determine information about the configured DRX2 based on information about currently configured DRX2 stored in UE 110 (e.g., configured in the past such as historical information). As another example, UE 110 may determine information about the configured DRX2 based on information received from a network node 115. As still another example, UE 110 may determine information about the configured DRX2 based on information received from another UE. As yet another example, UE 110 may determine information about the configured DRX2 based on pre-defined information (for example, based on any of the following pre-defined relations: between DRX1 and DRX2, between DRX1 and PTW, and between DRX1, DRX2 and PTW).

The reference time parameter T0 can be defined in any suitable manner. As one example, the reference time parameter T0 can be a time instance when network node 115 may transmit the paging message in the first cell. As another example, the reference time parameter T0 can be a time instance at which or after which when the UE may expect the reception of paging message within the same PTW in the first cell.

UE 110 determines whether a paging message is expected to be received in the first cell based on the obtained at least one of the number of DRX cycles of the second type remaining within the PTW with respect to the reference time in the first cell and the amount of time remaining within the PTW starting from the reference time. UE 110 may determine whether the paging message is expected to be received in any suitable manner. As one example, UE 110 may determine whether the paging message is expected to be received by comparing N0 with a threshold (Nt). The threshold, Nt, can be pre-defined, received from a network node 115 or received from another UE. In certain embodiments, the minimum value of Nt can be 2. The typical value of Nt can be 3 or 4. As another example, the UE may further or alternatively compare T1 with time threshold (Tt).

In certain embodiments, UE 110 may determine, based on the comparison, whether or not UE 110 will receive one or more paging messages from at least the first cell starting from the reference time (T0) until the end of the current PTW. UE 110 may determine whether or not it will receive the paging message and also the number of redundant paging messages within the same PTW in accordance with examples one through thirteen described above with respect to network node 115. For example, in certain embodiments UE 110 may determine that the paging message in the first cell is expected to be received provided N0 is equal to or larger than a threshold (Nt), otherwise not receiving the paging message in that PTW or receiving the paging message encoded with at least transport format more robust than a threshold (TFt). As another example, UE 110 may receive at least one paging message outside the PTW (e.g., before or after the PTW), for example by extending paging reception beyond the PTW.

In certain embodiments, if it is determined based on the comparison that UE 110 may receive one or more paging messages (e.g., when N0≥Nt) then UE 110 may adjust its receiver to be able to receive the paging message (e.g., set aside or temporarily assign memory and processing resources for receiving and processing the paging messages from at least cell1).

On the other hand, if it is determined based on the comparison that UE 110 is not expected to receive any paging message (e.g., when N0<Nt), then UE 110 may not temporarily assign or reserve its memory and processing resources for receiving the paging. Instead, UE 110 may use its memory and processing resources for other tasks (e.g., for performing radio measurements, processing of previously received data, partly turn off its baseband processing to save UE battery power, etc.).

According to an example embodiment, UE 110 may be required to receive all paging messages (i.e., to not miss any paging) in a PTW provided the paging is sent in at least some time T or N DRX cycles before the end of that PTW. For example, N=2, which may accommodate one first transmission (also known as initial transmission) and 2 retransmissions (redundancy versions of the paging message). In such a scenario, UE 110 would adjust its behavior adaptively (e.g., it may expect to not receive paging later than N DRX cycles before the end of the PTW and it would have to successfully receive the paging otherwise at least one some pre-defined conditions). This would also require UE 110 to store the first paging transmission in order to be able to combine the subsequent paging retransmissions corresponding to the first paging transmission, especially if the first transmission is not correctly decoded. On the other hand, UE 110 may decide not to store the first paging transmission if it is not correctly decoded and is not received at least T or N DRX cycles before the end of the PTW. At the same time, network node 115 would have to ensure the availability of the paging when UE 110 expects it (see also network node embodiments described above).

Figure 7:
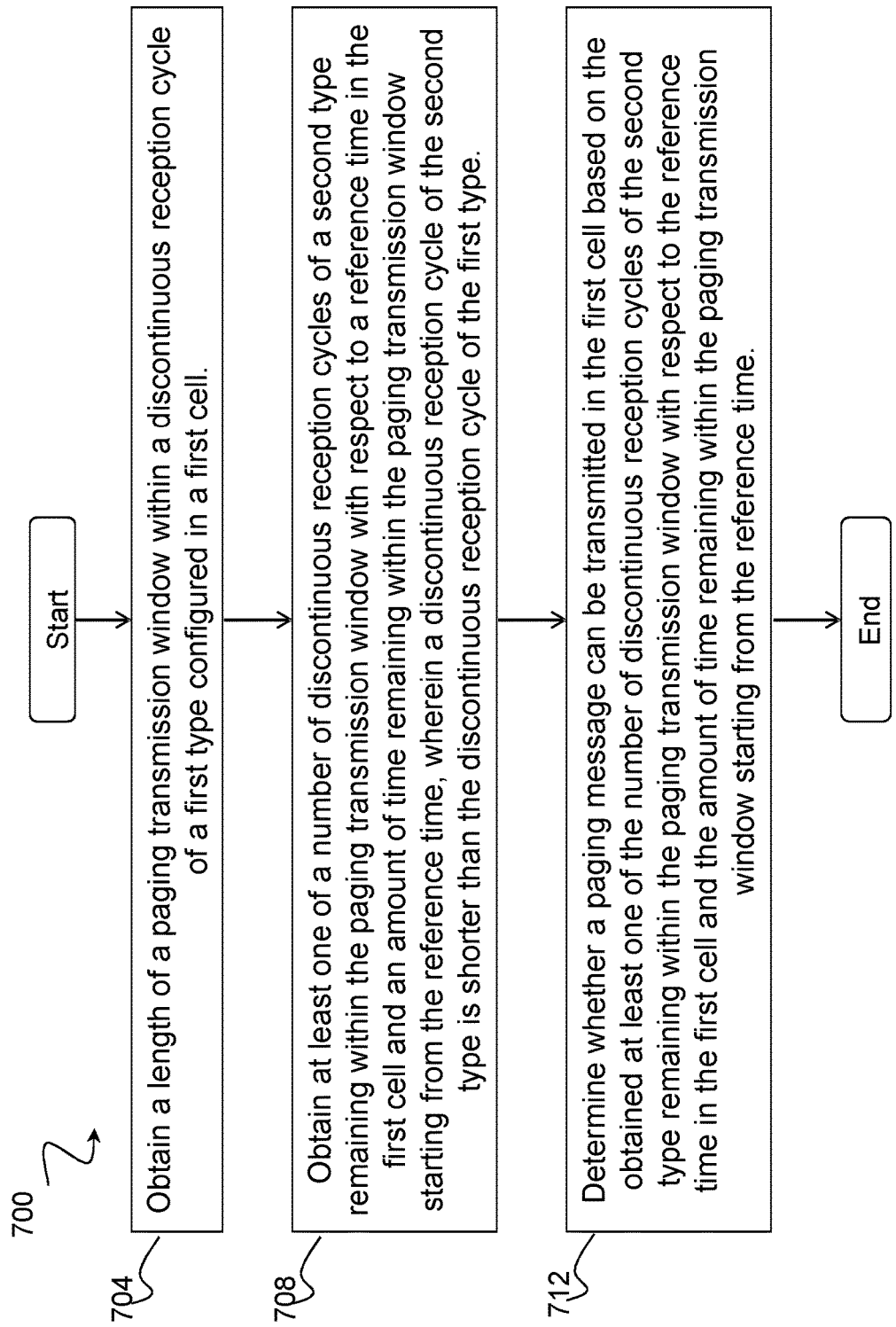
FIG. 7 is a flow chart of a method in a network node, in accordance with certain embodiments.

FIG. 7 is a flow chart of a method 700 in a network node, in accordance with certain embodiments. The method 700 begins at step 704, where the network node obtains a length of a paging transmission window within a discontinuous reception cycle of a first type configured in a first cell. In certain embodiments, the first type of discontinuous reception may be extended discontinuous reception.

At step 708, the network node obtains at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type. In certain embodiments, the second type of discontinuous reception may be legacy discontinuous reception.

At step 712, the network node determines whether a paging message can be transmitted in the first cell based on the obtained at least one of the number of discontinuous reception cycles of the second type remaining within the paging transmission window with respect to the reference time in the first cell and the amount of time remaining within the paging transmission window starting from the reference time. In certain embodiments, the method may comprise indicating a result of the determination to at least one other node.

In certain embodiments, the method may comprise transmitting the paging message in the first cell upon determining at least one of: that the number of discontinuous reception cycles of the second type remaining within the paging transmission window is equal to or larger than a threshold value; and that the amount of time remaining within the paging transmission window starting from the reference time is equal to or larger than a time threshold value. The method may comprise transmitting one or more redundant copies of the transmitted paging message.

In certain embodiments, the method may comprise upon determining that the number of discontinuous reception cycles of the second type remaining within the paging transmission window is less than a threshold value, performing one of: not transmitting the paging message in the paging transmission window; deferring transmission of the paging message until a subsequent paging transmission window; transmitting the paging message in the paging transmission window with a transport format that is more robust than a transport format threshold value; and transmitting the paging message in the paging transmission window with a transmission power that is above a transmission power threshold.

In certain embodiments, the method may comprise transmitting at least one paging message outside the paging transmission window.

In certain embodiments, the method may comprise upon determining that the paging message cannot be transmitted in the first cell, adapting one or more of: the paging transmission window; the discontinuous reception cycle of the first type; and the discontinuous reception cycle of the second type. The method may comprise indicating a configuration for the paging message resulting from the adaptation to at least one other node.

Figure 8:
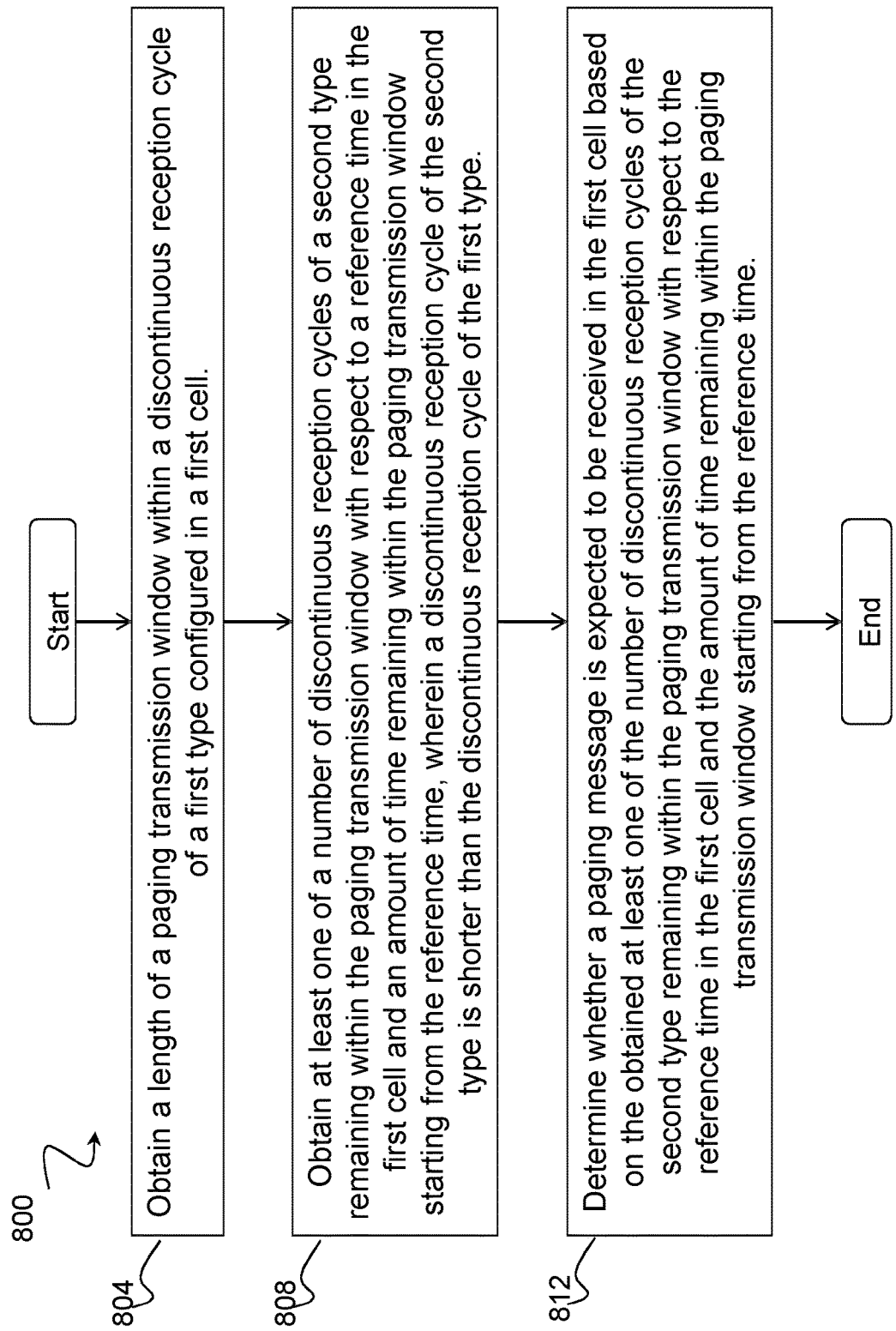
FIG. 8 is a flow chart of a method in a wireless device, in accordance with certain embodiments.

FIG. 8 is a flow chart of a method 800 in a wireless device, in accordance with certain embodiments. The method 800 begins at step 804, where the wireless device obtains a length of a paging transmission window within a discontinuous reception cycle of a first type configured in a first cell. In certain embodiments, the first type of discontinuous reception may be extended discontinuous reception At step 808, the wireless device obtains at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type. In certain embodiments, the second type of discontinuous reception may be legacy discontinuous reception.

At step 812, the wireless device determines whether a paging message is expected to be received in the first cell based on the obtained at least one of the number of discontinuous reception cycles of the second type remaining within the paging transmission window with respect to the reference time in the first cell and the amount of time remaining within the paging transmission window starting from the reference time.

In certain embodiments, the method may comprise receiving at least one paging message outside the paging transmission window.

In certain embodiments, the method may comprise upon determining that the paging message is expected to be received in the first cell, adjusting one or more receiver properties to facilitate receiving the paging messages. The method may comprise determining a number of redundant paging messages expected to be received during the paging transmission window. The method may comprise receiving the paging message and storing the received paging message for combining with one or more subsequently received redundant paging messages.

In certain embodiments, the method may comprise determining that the paging message is expected to be received in the first cell if the number of discontinuous reception cycles of the second type remaining within the paging transmission window is equal to or larger than a threshold value or the amount of time remaining within the paging transmission window starting from the reference time is equal to or larger than a time threshold value. The wireless device may be required to receive the paging message and one or more redundant transmissions of the paging message if sent before at least one of a predefined period of time before an end of the paging transmission window and a predefined number of discontinuous reception cycles of the second type before the end of the paging transmission window.

In certain embodiments, the method may comprise determining that a paging message is not expected to be received if the number of discontinuous reception cycles of the second type remaining within the paging window is less than a threshold value. In certain embodiments, the method may comprise determining that a paging message is expected to be received using a transport format that is more robust than a transport format threshold if the number of discontinuous reception cycles of the second type remaining within the paging window is less than a threshold value.

Figure 9:
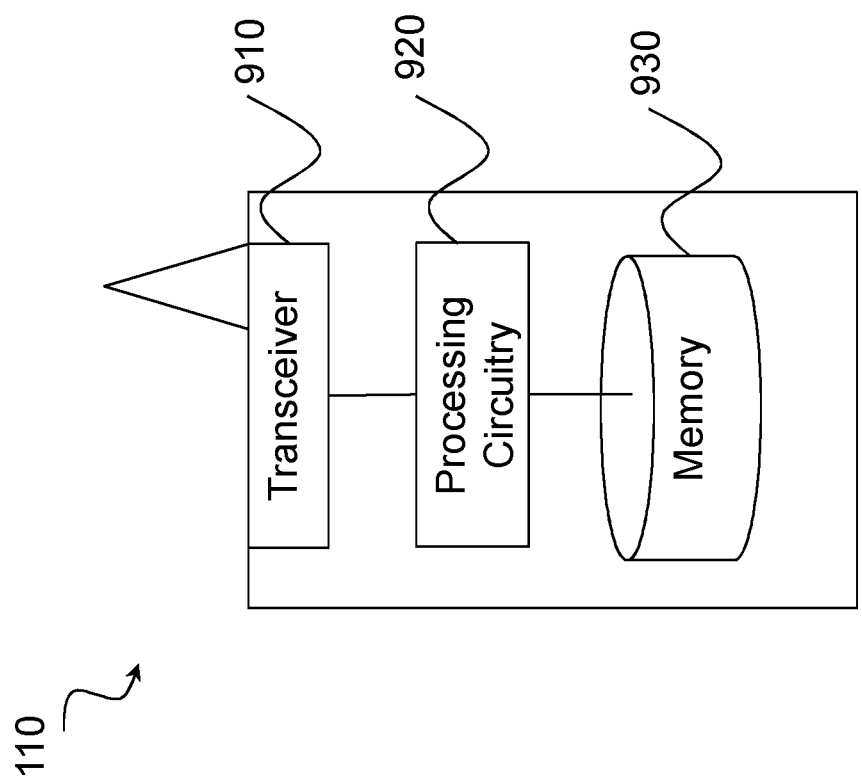
FIG. 9 is a schematic block diagram of an exemplary wireless device, in accordance with certain embodiments.

FIG. 9 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 910, processing circuitry 920, and memory 930. In some embodiments, transceiver 910 facilitates transmitting wireless signals to and receiving wireless signals from network node 115 (e.g., via an antenna), processing circuitry 920 executes instructions to provide some or all of the functionality described above as being provided by wireless device 110, and memory 930 stores the instructions executed by processing circuitry 920.

Processing circuitry 920 may include any suitable combination of hardware and software implemented in one or more modules to execute instructions and manipulate data to perform some or all of the described functions of wireless device 110, such as the functions of wireless device 110 described above in relation to FIGS. 1-8. In some embodiments, processing circuitry 920 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 930 is generally operable to store instructions, such as a computer program, software, an application including one or more of logic, rules, algorithms, code, tables, etc. and/or other instructions capable of being executed by processing circuitry 920. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 920.

Other embodiments of wireless device 110 may include additional components beyond those shown in FIG. 9 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 920. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
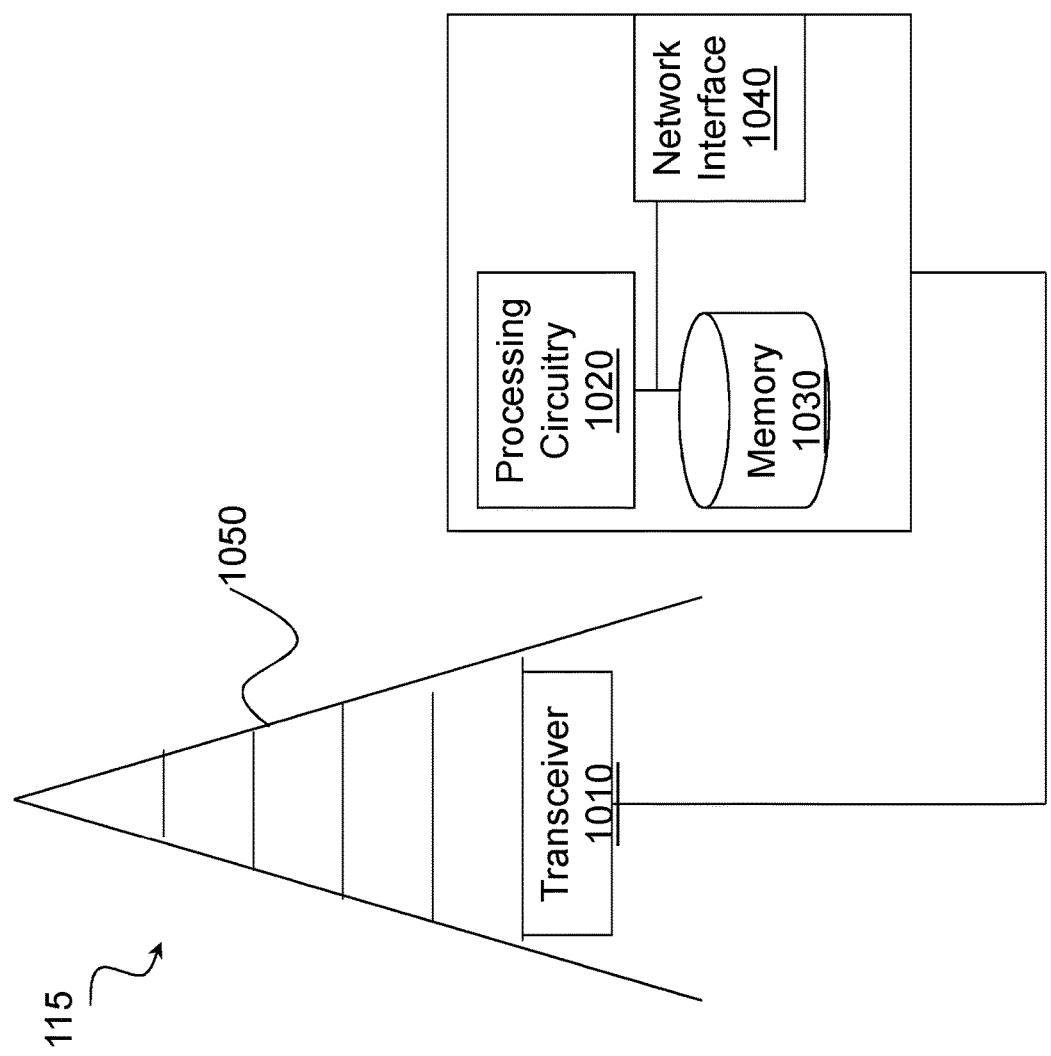
FIG. 10 is a schematic block diagram of an exemplary network node, in accordance with certain embodiments.

FIG. 10 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1010, processing circuitry 1020, memory 1030, and network interface 1040. In some embodiments, transceiver 1010 facilitates transmitting wireless signals to and receiving wireless signals from wireless device 110 (e.g., via antenna 1050), processing circuitry 1020 executes instructions to provide some or all of the functionality described above as being provided by a network node 115, memory 1030 stores the instructions executed by processing circuitry 1020, and network interface 1040 communicates signals to backend network components, such as a gateway, switch, router, Internet, Public Switched Telephone Network (PSTN), core network nodes or radio network controllers 130, etc.

Processing circuitry 1020 may include any suitable combination of hardware and software implemented in one or more modules to execute instructions and manipulate data to perform some or all of the described functions of network node 115, such as those described above in relation to FIGS. 1-8. In some embodiments, processing circuitry 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by processing circuitry 1020. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processing circuitry 1020 and may refer to any suitable device operable to receive input for network node 115, send output from network node 115, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of network node 115 may include additional components beyond those shown in FIG. 10 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 11:
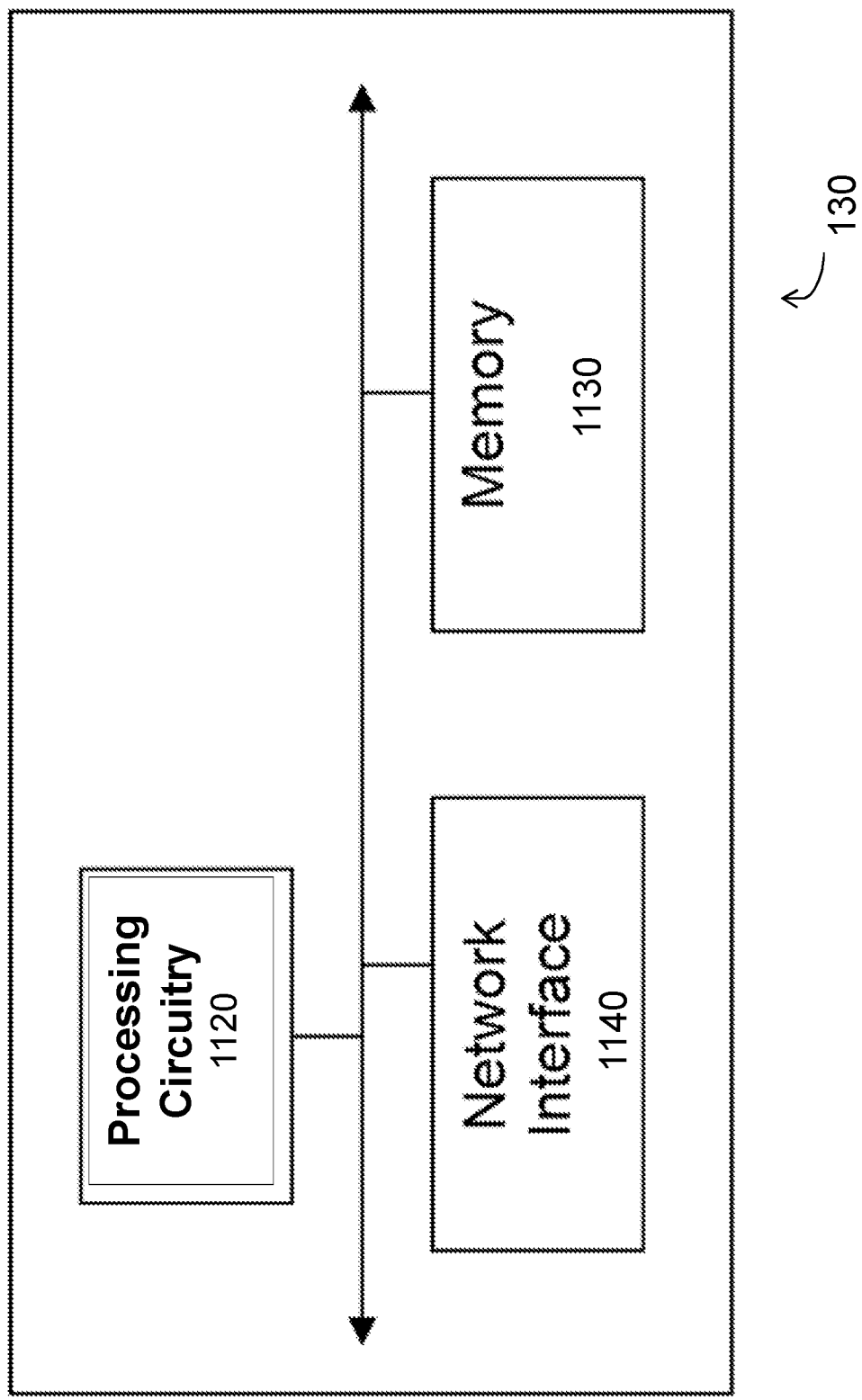
FIG. 11 is a schematic block diagram of an exemplary radio network controller or core network node, in accordance with certain embodiments.

FIG. 11 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 1120, memory 1130, and network interface 1140. In some embodiments, processing circuitry 1120 executes instructions to provide some or all of the functionality described above as being provided by the network node, memory 1130 stores the instructions executed by processing circuitry 1120, and network interface 1140 communicates signals to any suitable node, such as a gateway, switch, router, Internet, Public Switched Telephone Network (PSTN), network nodes 115, radio network controllers or core network nodes 130, etc.

Processing circuitry 1120 may include any suitable combination of hardware and software implemented in one or more modules to execute instructions and manipulate data to perform some or all of the described functions of the radio network controller or core network node 130. In some embodiments, processing circuitry 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by processing circuitry 1120. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processing circuitry 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including any functionality necessary to support the solution described above).

Figure 12:
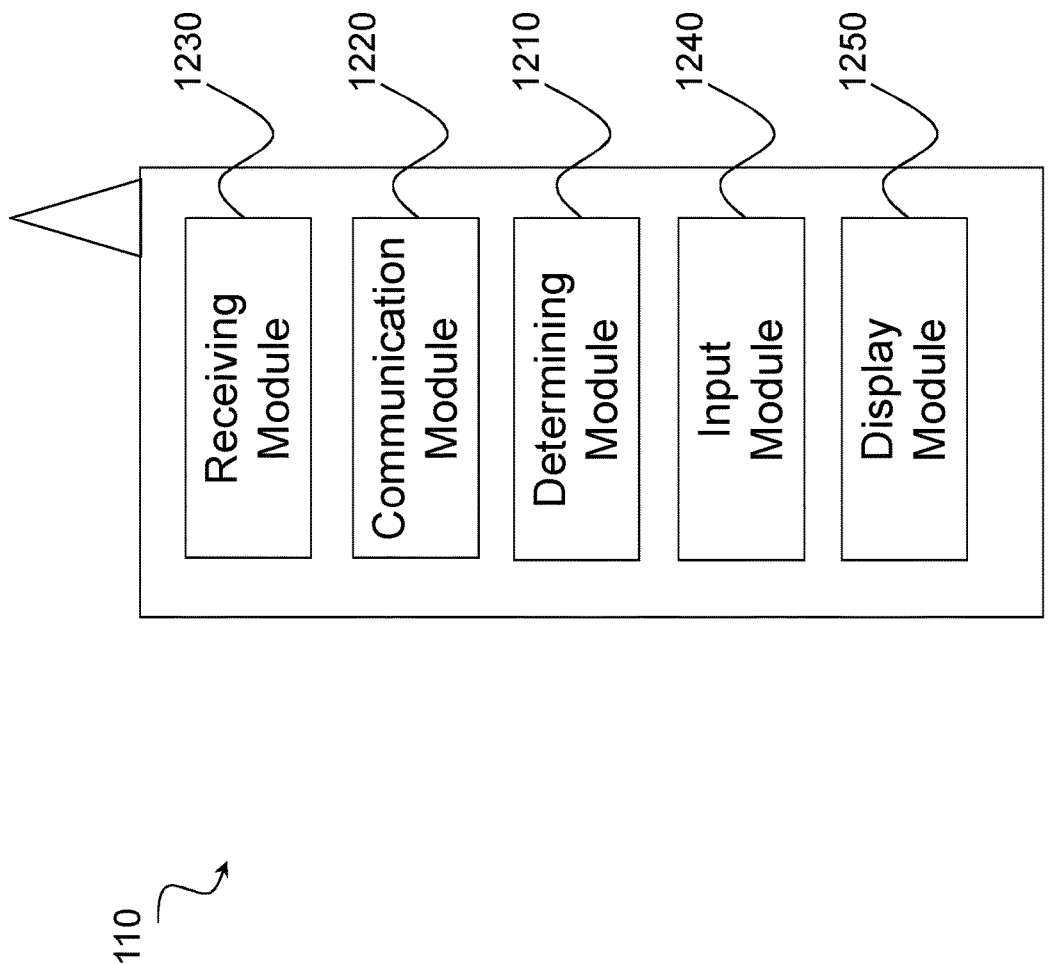
FIG. 12 is a schematic block diagram of an exemplary wireless device, in accordance with certain embodiments.

FIG. 12 is a schematic block diagram of an exemplary wireless device, in accordance with certain embodiments. Wireless device 110 may include one or more modules. For example, wireless device 110 may include a determining module 1210, a communication module 1220, a receiving module 1230, an input module 1240, a display module 1250, and any other suitable modules. In some embodiments, one or more of determining module 1210, communication module 1220, receiving module 1230, input module 1240, display module 1250, or any other suitable module may be implemented using one or more processors, such as processing circuitry 920 described above in relation to FIG. 9. In certain embodiments, the functions of two or more of the various modules may be combined into a single module. Wireless device 110 may perform the methods for reliable paging transmission under UE eDRX described above with respect to FIGS. 1-8.

Determining module 1210 may perform the processing functions of wireless device 110. As one example, determining module 1210 may obtain a length of a paging transmission window within a discontinuous reception cycle of a first type configured in a first cell. As another example, determining module 1210 may obtain at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type. As still another example, determining module 1210 may determine whether a paging message is expected to be received in the first cell based on the obtained at least one of the number of discontinuous reception cycles of the second type remaining within the paging transmission window with respect to the reference time in the first cell and the amount of time remaining within the paging transmission window starting from the reference time. As yet another example, determining module 1210 may, upon determining that the paging message is expected to be received in the first cell, adjust one or more receiver properties to facilitate receiving the paging messages. As another example, determining module 1210 may determine a number of redundant paging messages expected to be received during the paging transmission window. As another example, determining module 1210 may store the received paging message for combining with one or more subsequently received redundant paging messages.

As another example, determining module 1210 may determine that the paging message is expected to be received in the first cell if the number of discontinuous reception cycles of the second type remaining within the paging transmission window is equal to or larger than a threshold value or the amount of time remaining within the paging transmission window starting from the reference time is equal to or larger than a time threshold value. As another example, determining module 1210 may determine that a paging message is not expected to be received if the number of discontinuous reception cycles of the second type remaining within the paging window is less than a threshold value.

As still another example, determining module 1210 may determine that a paging message is expected to be received using a transport format that is more robust than a transport format threshold if the number of discontinuous reception cycles of the second type remaining within the paging window is less than a threshold value.

Determining module 1210 may include or be included in one or more processors, such as processing circuitry 920 described above in relation to FIG. 9. Determining module 1210 may include analog and/or digital circuitry configured to perform any of the functions of determining module 1210 and/or processing circuitry 920 described above. The functions of determining module 1210 described above may, in certain embodiments, be performed in one or more distinct modules.

Communication module 1220 may perform the transmission functions of wireless device 110. Communication module 1220 may include a transmitter and/or a transceiver, such as transceiver 910 described above in relation to FIG. 9. Communication module 1220 may include circuitry configured to wirelessly transmit messages and/or signals. In particular embodiments, communication module 1220 may receive messages and/or signals for transmission from determining module 1210. In certain embodiments, the functions of communication module 1220 described above may be performed in one or more distinct modules.

Receiving module 1230 may perform the receiving functions of wireless device 110. For example, receiving module 1230 may obtain a length of a paging transmission window within a discontinuous reception cycle of a first type configured in a first cell. As another example, receiving module 1230 may obtain at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type. As still another example, receiving module 1230 may receive the paging message. As yet another example, receiving module 1230 may receive at least one paging message outside the paging transmission window.

Receiving module 1230 may include a receiver and/or a transceiver. Receiving module 1230 may include a receiver and/or a transceiver, such as transceiver 910 described above in relation to FIG. 9. Receiving module 1230 may include circuitry configured to wirelessly receive messages and/or signals. In particular embodiments, receiving module 1230 may communicate received messages and/or signals to determining module 1210. The functions of receiving module 1230 described above may, in certain embodiments, be performed in one or more distinct modules.

Input module 1240 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1210. The functions of input module 1240 described above may, in certain embodiments, be performed in one or more distinct modules.

Display module 1250 may present signals on a display of wireless device 110. Display module 1250 may include the display and/or any appropriate circuitry and hardware configured to present signals on the display. Display module 1250 may receive signals to present on the display from determining module 1210. The functions of display module 1250 described above may, in certain embodiments, be performed in one or more distinct modules.

Determining module 1210, communication module 1220, receiving module 1230, input module 1240, and display module 1250 may include any suitable configuration of hardware and/or software. Wireless device 110 may include additional modules beyond those shown in FIG. 12 that may be responsible for providing any suitable functionality, including any of the functionality described above and/or any additional functionality (including any functionality necessary to support the various solutions described herein).

Figure 13:
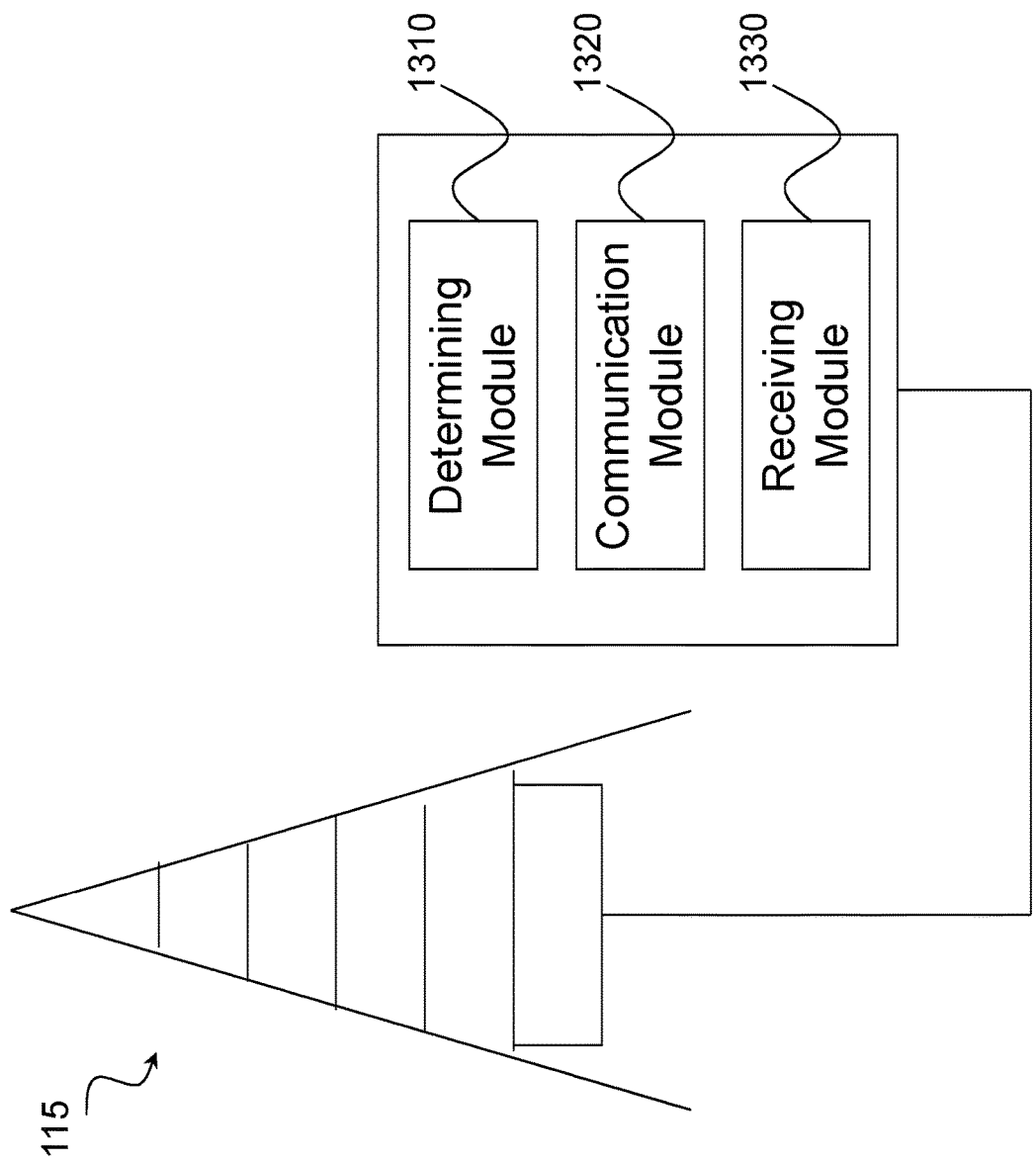
FIG. 13 is a schematic block diagram of an exemplary network node, in accordance with certain embodiments.

FIG. 13 is a schematic block diagram of an exemplary network node 115, in accordance with certain embodiments. Network node 115 may include one or more modules. For example, network node 115 may include determining module 1310, communication module 1320, receiving module 1330, and any other suitable modules. In some embodiments, one or more of determining module 1310, communication module 1320, receiving module 1330, or any other suitable module may be implemented using one or more processors, such as processing circuitry 1020 described above in relation to FIG. 10. In certain embodiments, the functions of two or more of the various modules may be combined into a single module. Network node 115 may perform the methods for reliable paging transmission under UE eDRX described above with respect to FIGS. 1-8.

Determining module 1310 may perform the processing functions of network node 115. As an example, determining module 1310 may obtain a length of a paging transmission window within a discontinuous reception cycle of a first type configured in a first cell. As another example, determining module 1310 may obtain at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type. As still another example, determining module 1310 may determine whether a paging message can be transmitted in the first cell based on the obtained at least one of the number of discontinuous reception cycles of the second type remaining within the paging transmission window with respect to the reference time in the first cell and the amount of time remaining within the paging transmission window starting from the reference time. As yet another example, determining module 1310 may determine that the number of discontinuous reception cycles of the second type remaining within the paging transmission window is equal to or larger than a threshold value and/or that the amount of time remaining within the paging transmission window starting from the reference time is equal to or larger than a time threshold value. As another example, determining module 1310 may determine that the number of discontinuous reception cycles of the second type remaining within the paging transmission window is less than a threshold value. As another example, determining module 1310 may, upon determining that the paging message cannot be transmitted in the first cell, adapt one or more of: the paging transmission window; the discontinuous reception cycle of the first type; and the discontinuous reception cycle of the second type.

Determining module 1310 may include or be included in one or more processors, such as processing circuitry 1020 described above in relation to FIG. 10. Determining module 1310 may include analog and/or digital circuitry configured to perform any of the functions of determining module 1310 and/or processing circuitry 1020 described above. The functions of determining module 1310 may, in certain embodiments, be performed in one or more distinct modules.

Communication module 1320 may perform the transmission functions of network node 115. As one example, communication module 1320 may indicate a result of the determination to at least one other node (e.g., another network node or a wireless device). As another example, communication module 1320 may transmit the paging message in the first cell upon determining (e.g., by determining module 1310) at least one of: that the number of discontinuous reception cycles of the second type remaining within the paging transmission window is equal to or larger than a threshold value; and that the amount of time remaining within the paging transmission window starting from the reference time is equal to or larger than a time threshold value. As still another example, communication module 1320 may transmit one or more redundant copies of the transmitted paging message. As yet another example, communication module 1320 may perform one or more of: deferring transmission of the paging message until a subsequent paging transmission window; transmitting the paging message in the paging transmission window with a transport format that is more robust than a transport format threshold value; and transmitting the paging message in the paging transmission window with a transmission power that is above a transmission power threshold. As another example, communication module 1320 may transmit at least one paging message outside the paging transmission window. As another example, communication module 1320 may indicate a configuration for the paging message resulting from the adaptation to at least one other node.

Communication module 1320 may transmit messages to one or more of wireless devices 110. Communication module 1320 may include a transmitter and/or a transceiver, such as transceiver 1010 described above in relation to FIG. 10. Communication module 1320 may include circuitry configured to wirelessly transmit messages and/or signals. In particular embodiments, communication module 1320 may receive messages and/or signals for transmission from determining module 1310 or any other module. The functions of communication module 1320 may, in certain embodiments, be performed in one or more distinct modules.

Receiving module 1330 may perform the receiving functions of network node 115. As one example, receiving module 1330 may obtain a length of a paging transmission window within a discontinuous reception cycle of a first type configured in a first cell. As another example, receiving module 1330 may obtain at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type.

Receiving module 1330 may receive any suitable information from a wireless device. Receiving module 1330 may include a receiver and/or a transceiver, such as transceiver 1010 described above in relation to FIG. 10. Receiving module 1330 may include circuitry configured to wirelessly receive messages and/or signals. In particular embodiments, receiving module 1330 may communicate received messages and/or signals to determining module 1310 or any other suitable module. The functions of receiving module 1330 may, in certain embodiments, be performed in one or more distinct modules.

Determining module 1310, communication module 1320, and receiving module 1330 may include any suitable configuration of hardware and/or software. Network node 115 may include additional modules beyond those shown in FIG. 13 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP Third Generation Partnership Project
ACK Acknowledgement
AP Access Point
BS Base Station
BSC Base Station Controller
BTS Base Transceiver Station
CA Carrier Aggregation
CDM Code Division Multiplexing
CPE Customer Premises Equipment
CQI Channel Quality Indicator
CSI-RSRP Reference symbol received power using CSI reference symbols
D2D Device-to-device
DAS Distributed Antenna System
DL Downlink
DRS Discovery Signal
DRX Discontinuous Reception
eDRX Extended Discontinuous Reception
eNB Evolved Node B
EPDCCH Enhanced Physical Downlink Control Channel
E-UTRAN Evolved UMTS Terrestrial Radio Access Network
FDD Frequency Division Duplex
HARQ Hybrid Automatic Repeat Request
H-SFN Hyper System Frame Number
HSPA High Speed Packet Access
IDC In-Device Coexistence
LAA License assisted access
LAN Local Area Network
LBT Listen before talk
LEE Laptop Embedded Equipment
LME Laptop Mounted Equipment
LTE Long Term Evolution
M2M Machine-to-Machine
MAC Medium Access Control
MAN Metropolitan Area Network
MCE Multi-cell/multicast Coordination Entity
MME Mobility Management Entity
MSR Multi-standard Radio
NAK Negative Acknowledgement
NAS Non-Access Stratum
PBCH Physical Broadcast Channel
PCC Primary Component Carrier
PCell Primary Cell
PDCCH Physical Downlink Control Channel
PDSCH Physical Downlink Shared Channel
PF Paging Frame
PH Paging Hyper-System Frame Number
PO Paging Occasion
PSC Primary Serving Cell
PSTN Public Switched Telephone Network
PTW Paging Transmission Window
PUSCH Physical Uplink Shared Channel
PUCCH Physical Uplink Control Channel
RAT Radio Access Technology
RB Resource Block
RNC Radio Network Controller
RRC Radio Resource Control
RRH Remote Radio Head
RRU Remote Radio Unit
RSRP Reference symbol received power
RSRQ Reference symbol received quality
RTT Round Trip Time
SI System Information
SIB System Information Block
SFN System Frame Number
SCC Secondary Component Carrier
SCell Secondary CEll
SSC Secondary Serving Cell
TDD Time Division Duplex
UE User Equipment
UL Uplink
UTRA UMTS Terrestrial Radio Access
WAN Wide Area Network
LTE Long-Term Evolution

The invention claimed is:

1. A method in a network node, comprising:
obtaining a length of a paging transmission window within a discontinuous reception cycle of a first type configured in a first cell;
obtaining at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type;
determining whether a paging message can be transmitted in the first cell based on the obtained at least one of the number of discontinuous reception cycles of the second type remaining within the paging transmission window with respect to the reference time in the first cell and the amount of time remaining within the paging transmission window starting from the reference time; and
transmitting at least one paging message outside the paging transmission window.

2. The method of claim 1, wherein:
the first type of discontinuous reception is extended discontinuous reception; and
the second type of discontinuous reception is legacy discontinuous reception.

3. The method of claim 1, comprising:
indicating a result of the determination to at least one other node.

4. The method of claim 1, comprising:
transmitting the paging message in the first cell upon determining at least one of:
that the number of discontinuous reception cycles of the second type remaining within the paging transmission window is equal to or larger than a threshold value; and
that the amount of time remaining within the paging transmission window starting from the reference time is equal to or larger than a time threshold value.

5. The method of claim 4, comprising:
transmitting one or more redundant copies of the transmitted paging message.

6. The method of claim 1, comprising:
upon determining that the number of discontinuous reception cycles of the second type remaining within the paging transmission window is less than a threshold value, performing one of:
not transmitting the paging message in the paging transmission window;
deferring transmission of the paging message until a subsequent paging transmission window;
transmitting the paging message in the paging transmission window with a transport format that is more robust than a transport format threshold value; and
transmitting the paging message in the paging transmission window with a transmission power that is above a transmission power threshold.

7. The method of claim 1, comprising:
upon determining that the paging message cannot be transmitted in the first cell, adapting one or more of:
the paging transmission window;
the discontinuous reception cycle of the first type; and
the discontinuous reception cycle of the second type.

8. The method of claim 7, comprising:
indicating a configuration for the paging message resulting from the adaptation to at least one other node.

9. A method in a wireless device, comprising:
obtaining a length of a paging transmission window within a discontinuous reception cycle of a first type configured in a first cell;
obtaining at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type;
determining whether a paging message is expected to be received in the first cell based on the obtained at least one of the number of discontinuous reception cycles of the second type remaining within the paging transmission window with respect to the reference time in the first cell and the amount of time remaining within the paging transmission window starting from the reference time; and
receiving at least one paging message outside the paging transmission window.

10. The method of claim 9, wherein:
the first type of discontinuous reception is extended discontinuous reception; and
the second type of discontinuous reception is legacy discontinuous reception.

11. The method of claim 9, comprising:
upon determining that the paging message is expected to be received in the first cell, adjusting one or more receiver properties to facilitate receiving the paging messages.

12. The method of claim 11, comprising:
determining a number of redundant paging messages expected to be received during the paging transmission window.

13. The method of claim 11, comprising:
receiving the paging message; and
storing the received paging message for combining with one or more subsequently received redundant paging messages.

14. The method of claim 9, comprising:
determining that the paging message is expected to be received in the first cell if the number of discontinuous reception cycles of the second type remaining within the paging transmission window is equal to or larger than a threshold value or the amount of time remaining within the paging transmission window starting from the reference time is equal to or larger than a time threshold value.

15. The method of claim 14, wherein the wireless device is required to receive the paging message and one or more redundant transmissions of the paging message if sent before at least one of a predefined period of time before an end of the paging transmission window and a predefined number of discontinuous reception cycles of the second type before the end of the paging transmission window.

16. The method of claim 9, comprising:
determining that a paging message is not expected to be received if the number of discontinuous reception cycles of the second type remaining within the paging window is less than a threshold value.

17. The method of claim 9, comprising:
determining that a paging message is expected to be received using a transport format that is more robust than a transport format threshold if the number of discontinuous reception cycles of the second type remaining within the paging window is less than a threshold value.

18. A network node, comprising:
processing circuitry, the processing circuitry configured to:
obtain a length of a paging transmission window within a discontinuous reception cycle of a first type configured in a first cell;
obtain at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type;
determine whether a paging message can be transmitted in the first cell based on the obtained at least one of the number of discontinuous reception cycles of the second type remaining within the paging transmission window with respect to the reference time in the first cell and the amount of time remaining within the paging transmission window starting from the reference time; and transmit at least one paging message outside the paging transmission window.

19. A wireless device, comprising:

processing circuitry, the processing circuitry configured to:

obtain a length of a paging transmission window within a discontinuous reception cycle of a first type configured in a first cell;

obtain at least one of a number of discontinuous reception cycles of a second type remaining within the paging transmission window with respect to a reference time in the first cell and an amount of time remaining within the paging transmission window starting from the reference time, wherein a discontinuous reception cycle of the second type is shorter than the discontinuous reception cycle of the first type;

determine whether a paging message is expected to be received in the first cell based on the obtained at least one of the number of discontinuous reception cycles of the second type remaining within the paging transmission window with respect to the reference time in the first cell and the amount of time remaining within the paging transmission window starting from the reference time; and receive at least one paging message outside the paging transmission window.

* * * * *